United States Patent [19]

Matsui et al.

[11] Patent Number: 5,719,886
[45] Date of Patent: Feb. 17, 1998

[54] SYSTEM FOR OPTICALLY RECORDING/ REPRODUCING MULTIMEDIA INFORMATION USING CODE DATA

[75] Inventors: Shinzo Matsui, Uenoharamachi; Ryoichi Sawaki, Hachioji; Yoshiyuki Nada, Hachioji; Hiroo Hosono, Hachioji; Kenji Kishi, Yokohama; Yoshikazu Yamada, Hino, all of Japan

[73] Assignee: Olympus Optical Co., Ltd., Tokyo, Japan

[21] Appl. No.: 593,557

[22] Filed: Jan. 29, 1996

[30] Foreign Application Priority Data

Feb. 3, 1995 [JP] Japan ................... 7-017168

[51] Int. Cl.$^6$ ............... G11B 20/18; G11B 27/034; G11B 27/10
[52] U.S. Cl. ............... 371/40.1; 369/32; 369/33
[58] Field of Search ............... 371/40.1; 369/33, 369/275.3, 32; 395/615

[56] References Cited

U.S. PATENT DOCUMENTS 5,428,730  6/1995  Baker et al. ............... 395/154
5,555,098  9/1996  Parulski ............... 358/341
5,574,843  11/1996  Gerlach, Jr. ............... 395/118
5,624,265  4/1997  Redford et al. ............... 434/307 R

*Primary Examiner*—Stephen M. Baker
*Attorney, Agent, or Firm*—Frishauf, Holtz, Goodman, Langer & Chick

[57] ABSTRACT

A reading section optically reads a code from a recording medium having a portion on which multimedia information including at least one of audio information, video information, and digital code data is recorded as an optically readable code. A plurality of processing sections sequentially process the code read by the reading section and output the processed code as the original multimedia information. An operation switch designates the start of reading of the code. A control section causes one or a plurality of the plurality of processing sections to terminate a processing operation for a code which has been read by the time the operation switch is operated, and executes processing for data of the processed code in correspondence with another processing section on a subsequent stage, on the basis of the operation of the operation switch after the start of reading is designated by the operation switch.

43 Claims, 18 Drawing Sheets

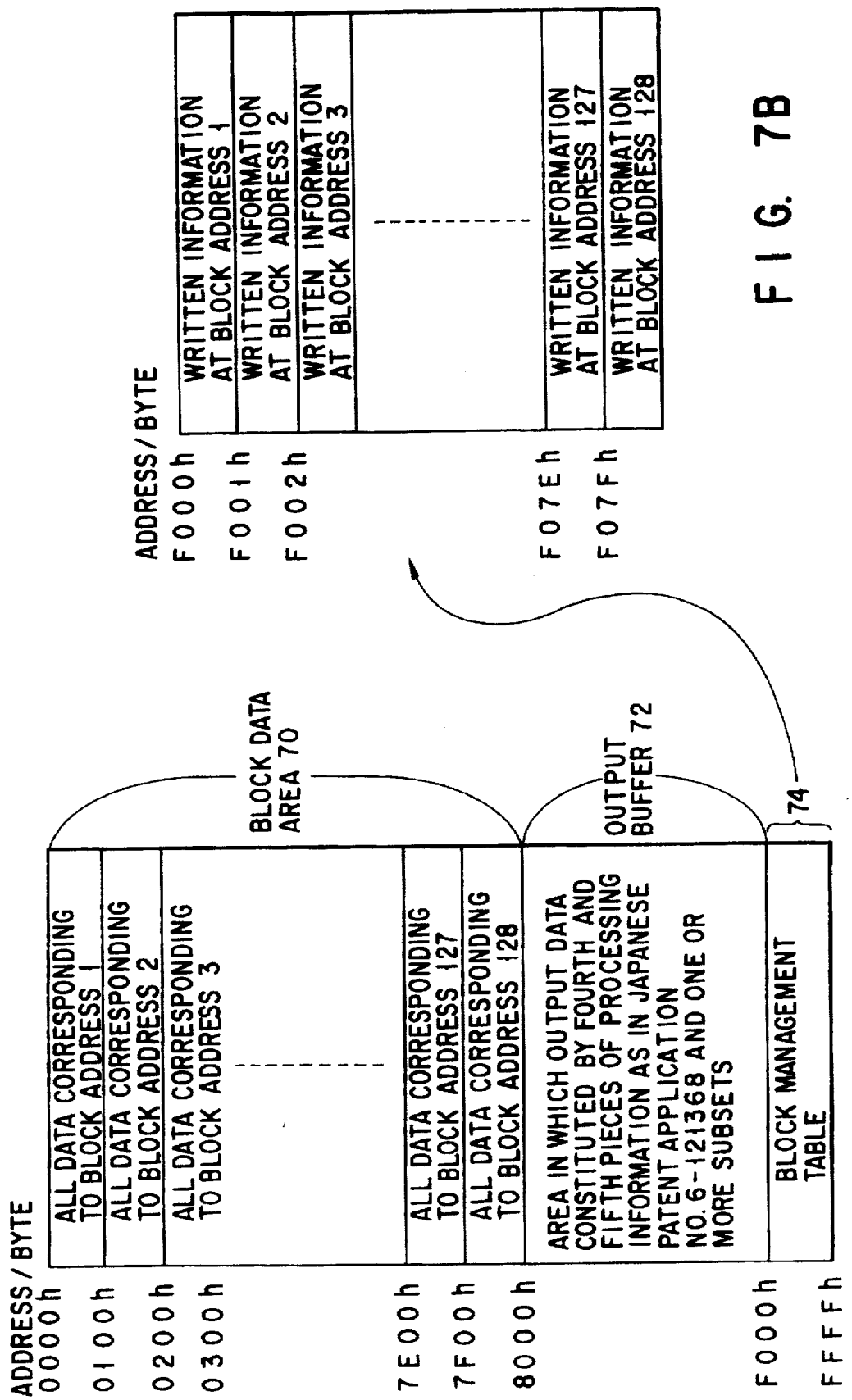

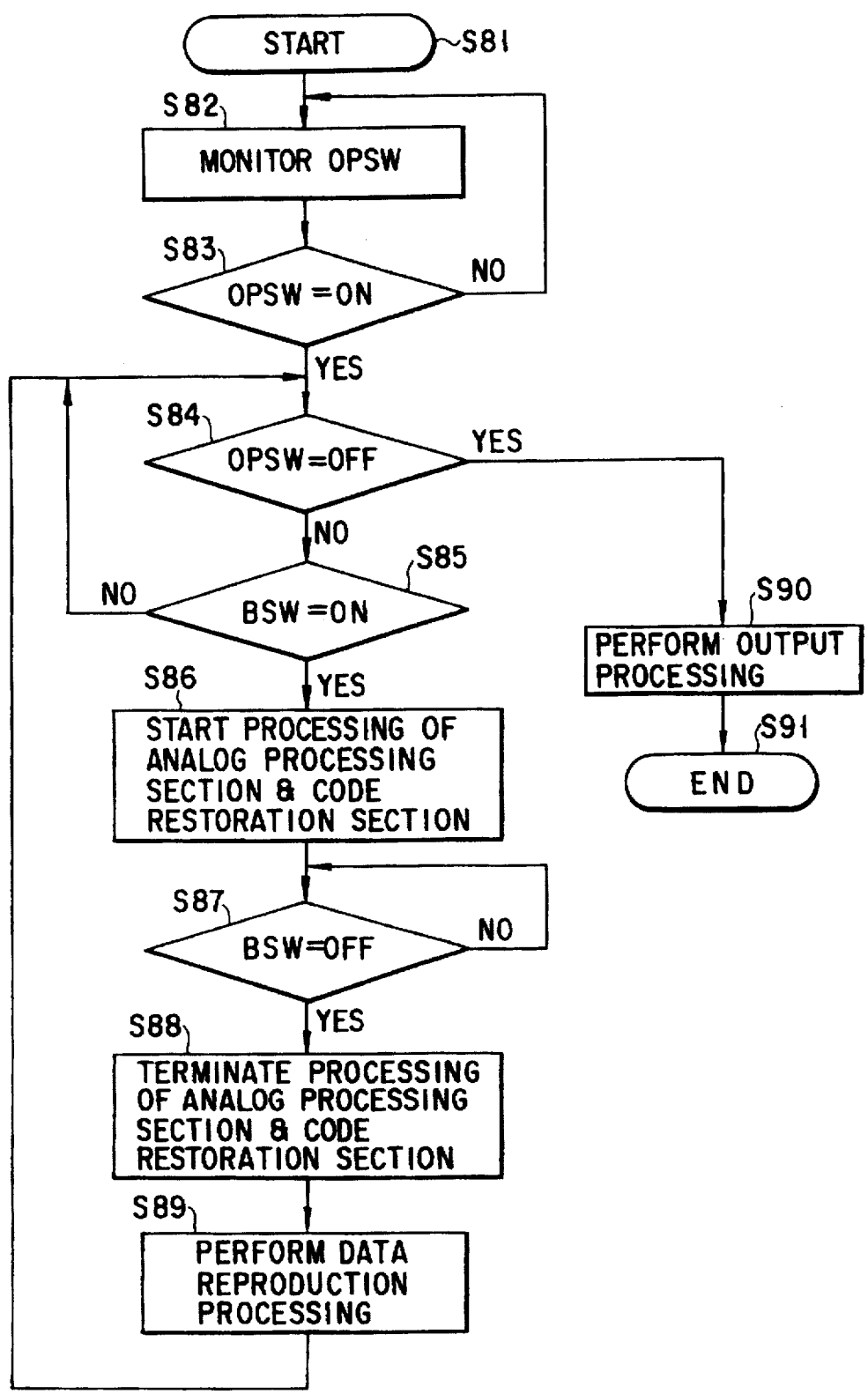
F I G. 12

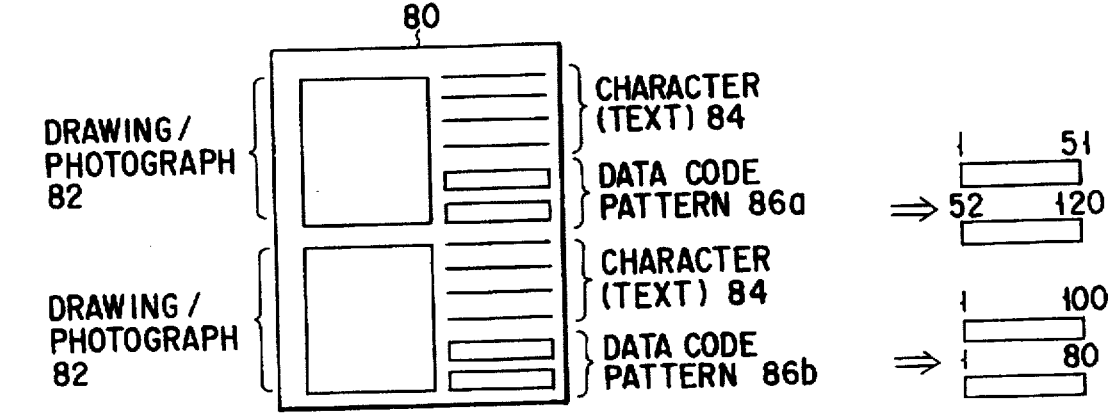
FIG. 13A
FIG. 13B
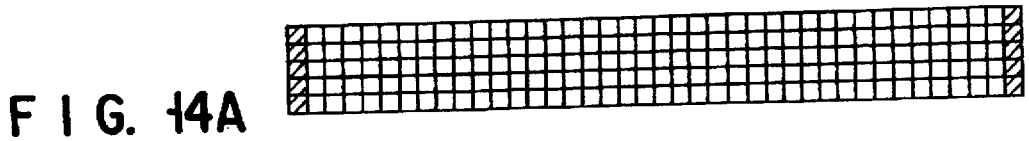
FIG. 14A
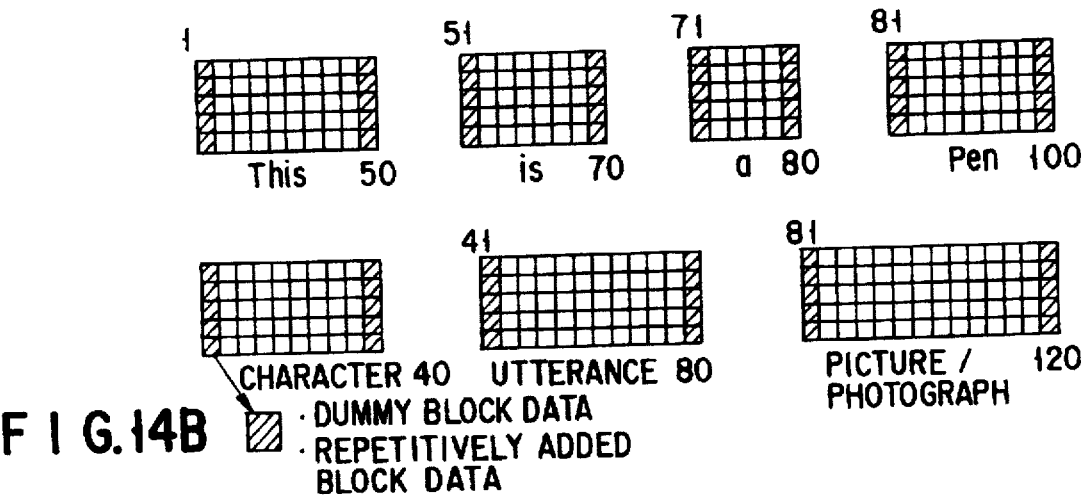
FIG. 14B

⊕ SW ON
⊞ SW OFF

▭ INDICATES UNIT OF SCANNING

⊕ SW ON
⊞ SW OFF

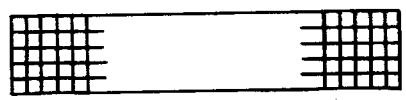
FIG. 17A
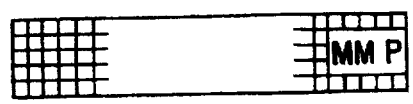
FIG. 17B
FIG. 17C
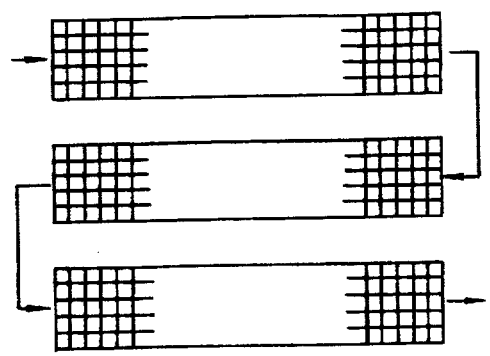
FIG. 17D
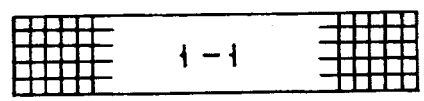
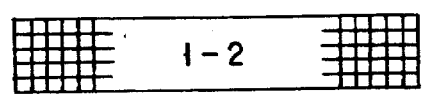
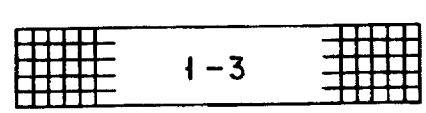
FIG. 18A
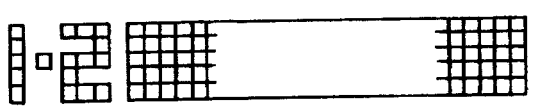
FIG. 18B
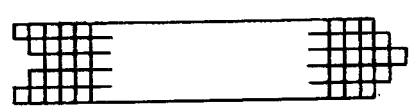
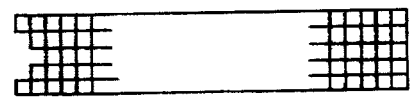
FIG. 18C

SYSTEM FOR OPTICALLY RECORDING/ REPRODUCING MULTIMEDIA INFORMATION USING CODE DATA

BACKGROUND OF THE INVENTION

1. Field of the Invention

The present invention relates to an information reproduction system for converting so-called multimedia information including, e.g., audio information such as speech and music information, video information obtained by a camera, a video equipment, and the like, and digital code data obtained from a personal computer, a wordprocessor, and the like to an optically readable code pattern, and optically reading the code pattern recorded on an information recording medium such as paper to reproduce the original multimedia information, an information recording system for recording the multimedia information as an optically readable pattern code on a recording medium such as paper, and the recording medium.

2. Description of the Related Art

As media for recording speech information, music information, and the like, a magnetic tape, an optical disk, and the like are conventionally known. However, even if copies of these media are produced in large quantities, the unit cost of production is relatively high, and storage of such copies requires a large space. In addition, when a medium on which speech information is recorded needs to be transferred to a person in a remote place, it takes much labor and time to mail or directly take the medium to the person.

So-called multimedia information other than audio information, including video information obtained by a camera or video equipment, and digital code data obtained from a personal computer or wordprocessor have the same problems.

The assignee for the present invention has assigned applications filed as U.S. Ser. Nos. 08/407,018 and 08/532,982, systems which can transmit multimedia information including at least one of audio information, video information, and digital code data through a facsimile apparatus and records the information in a form of dot codes as image information, i.e., code information allowing production of copies in large quantities at a low cost, on an information recording medium such as paper, and a system for reproducing this information.

According to the information reproduction system disclosed in U.S. Ser. No. 08/532,982, when the operation switch is turned on, image data is input, and each image unit block in the data is detected. When a block is detected, its block address is detected.

Subsequently, dot detection is performed in units of blocks, and data demodulation is performed. Thereafter, the detection of an image unit block is performed again, and the above processing is repeated. If no block is detected, the end of the processing is determined depending on whether the operation switch is turned off or a white image as the background of a medium is picked up.

In the above systems disclosed in U.S. Ser. No. 08/407, 018 and U.S. Ser. No. 08/532,982, no special consideration is given, in terms of human engineering, to the relationship between the operation switch and reproduction processing after data demodulation processing, e.g., interleaving and error correction processing, output processing, e.g., expansion and output processing, and the timings of reproduction processing and output processing, a man-machine interface which also perform various display operations, and the like.

SUMMARY OF THE INVENTION

The present invention has been made in consideration of the above points, and has as its object to provide an information reproduction system, an information recording system, and a recording medium, which allow easy operations for an operator, can attain a great improvement in operability, and realize an excellent man-machine interface in terms of human engineering and other respects.

In order to achieve the above object, according to the present invention, there is provided an information reproduction system including reading means for optically reading a code from a recording medium having a portion on which multimedia information including at least one of audio information, video information, and digital code data is recorded as an optically readable code, and a plurality of processing means for sequentially processing the code read by the reading means and outputting the processed code as the original multimedia information, comprising an operation switch for designating a start of reading of the code, and control means causing one or a plurality of the plurality of processing means to terminate a processing operation for a code which has been read by the time the operation switch is operated, and executing processing for data of the processed code in correspondence with another processing means on a subsequent stage, on the basis of an operation of the operation switch after the start of reading is designated by the operation switch.

In addition, there is provided a recording medium having a portion on which multimedia information including at least one of audio information, video information, and digital code data is recorded as optically readable codes, wherein an information reproduction system, which is adapted to read the codes and to which the codes are to be applied, has a data memory for storing demodulated data obtained by demodulating the codes, and a data amount of one of the codes is determined on the basis of a capacity of the data memory.

Furthermore, there is provided an information recording system including input means for inputting multimedia information including at least one of audio information, video information, and digital code data, conversion means for converting the multimedia information input by the input means into an optically readable code, and recording means for recording the code converted by the conversion means on a recording medium to be optically readable, the code being constituted by a linked structure obtained by two-dimensionally arranging blocks each having data associated with the multimedia information and unique address data thereof, comprising output layout editing means for performing layout editing of the multimedia information input by the input means with respect to a recording medium when the multimedia information is to be output to the recording means, and block address data setting means for setting block address data to be added to blocks constituting the code in accordance with a layout state of the code which is set by the output layout editing means.

The information reproduction system of the present invention includes the reading means for optically reading a code from a recording medium having a portion on which multimedia information is recorded as an optically readable code, and the plurality of processing means for sequentially processing the code read by the reading means and outputting the processed code as the original multimedia information. The start of reading of the code is designed by the operation switch. The control means causes one or a plurality of the plurality of processing means to terminate a processing operation for a code which has been read by the time the operation switch is operated, and executes processing for data of the processed code in correspondence with another processing means on a subsequent stage, on the basis of an operation of the operation switch after the start of reading is designated by the operation switch.

The recording medium of the present invention has a portion on which multimedia information is recorded as optically readable codes. The information reproduction system, which is adapted to read the codes and to which the codes are to be applied, has the data memory for storing demodulated data obtained by demodulating the codes. The data amount of one of the codes is determined on the basis of the capacity of the data memory.

The information recording system of the present invention includes the input means for inputting multimedia information, the conversion means for converting the multimedia information input by the input means into an optically readable code, and the recording means for recording the code converted by the conversion means on a recording medium to be optically readable. The code is constituted by a linked structure obtained by two-dimensionally arranging blocks each having data associated with the multimedia information and unique address data thereof. The output layout editing means performs layout editing of the multimedia information input by the input means with respect to a recording medium when the multimedia information is to be output to the recording means. The block address data setting means sets block address data to be added to blocks constituting the code in accordance with a layout state of the code which is set by the output layout editing means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given and the detailed description of the preferred embodiment given below, serve to explain the principles of the invention.

FIG. 7A is a view showing the overall memory map of a data memory 52;

FIG. 7B is a view showing a block management table in the memory map;

FIG. 12 is a flow chart showing processing in which the start of scanning of a pattern code is recognized and an output operation is performed with the operation switch 22 and a bottom switch;

FIGS. 13A and 13B are views showing arrangements of multimedia paper used in the information reproduction system;

FIG. 14A is a view showing a file of a pattern code;

FIG. 14B is a view showing a pattern code according to the second embodiment;

FIGS. 17A to 17D are views showing pattern codes according to modifications of the fourth embodiment;

FIGS. 18A to 18C are views showing pattern codes according to modifications of the fourth embodiment;

DETAILED DESCRIPTION OF THE PREFERRED EMBODIMENTS

Figure 1:
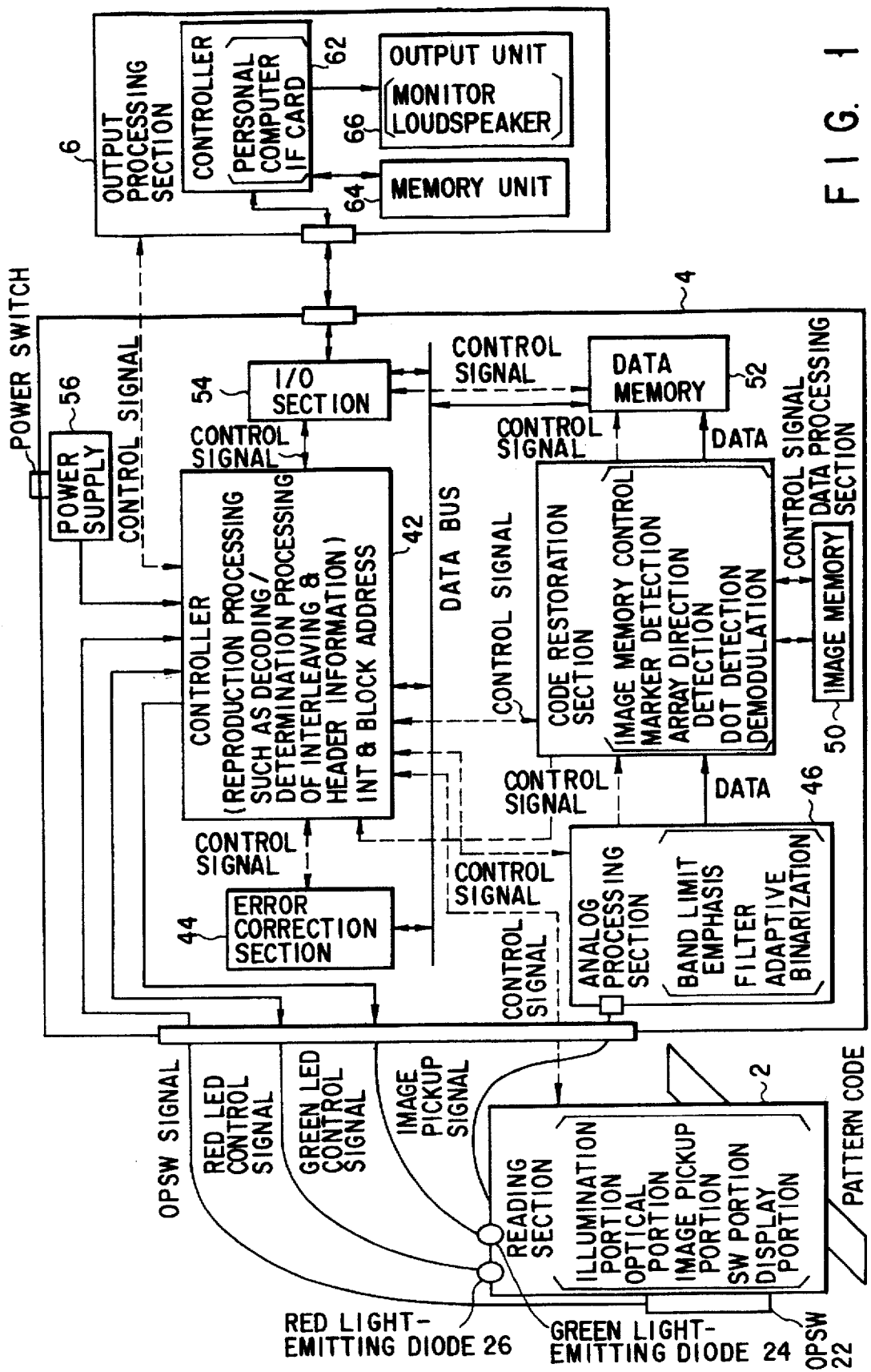
FIG. 1 is a block diagram showing the arrangement of an information reproduction system according to the first embodiment.

Reference will now be made in detail to the presently preferred embodiments of the invention as illustrated in the accompanying drawings, in which like reference characters designate like or corresponding parts throughout the several drawings.

Embodiments of the present invention will be described below with reference to the accompanying drawings.

An information reproduction system according to the first embodiment of the present invention will be described first.

FIG. 1 is a block diagram showing the arrangement of the information reproduction system of the first embodiment.

This information reproduction system mainly comprises a reading section 2, a data processing section 4, and an output processing section 6.

The reading section 2 is constituted by an operation switch (OPSW) 22 which is operated by an operator to designate the start and end of reproduction processing, a green light-emitting diode (to be referred to as an LED hereinafter) 24 for displaying a reproduction processing state upon scanning, a red LED 26 for displaying an error associated with scanning, an illumination portion, an optical portion, and an image pickup portion.

The data processing section 4 is constituted by a controller 42 for controlling the overall information reproduction system, an error correction section 44, an analog processing section 46, a code restoration section 48, an image memory 50, a data memory 52, an I/O section 54, and a power supply 56 for applying a driving voltage to the overall information reproduction system.

The output processing section 6 is constituted by a controller 62 provided as a personal computer (to be referred to as a PC hereinafter), an interface (I/F) card, or the like, a memory unit 64, and an output unit 66 such as a monitor or loudspeaker.

A signal from the operation switch 22 of the reading section 2 is input to the controller 42 in the data processing section 4. The controller 42 outputs control signals for the green and red LEDs 24 and 26 to turn on/off the green and red LEDs 24 and 26.

An image pickup signal from the reading section 2 is input to the analog processing section 46 in the data processing section 4. The image pickup signal input to the analog processing section 46 passes through a band limit emphasis filter and is converted into a digital code by adaptive binarization processing. The digital data is then output to the code restoration section 48. The code restoration section 48 performs control to store the image pickup signal of the input digital data in the image memory 50 or read out the data therefrom. In addition, the code restoration section 48 performs code restoration processing, e.g., marker detection, array direction detection, dot detection, and demodulation, for this image pickup signal, and outputs the resultant data to the data memory 52.

The data memory 52 stores the input data. The controller 42 performs interleaving, decoding and determination processing of header information, and the like with respect to the data stored in the data memory 52. The above data is transferred to the error correction section 44 to undergo error correction, and the resultant data is stored in another area of the data memory 52 again.

The data stored in the data memory 52 again is output to the output processing section 6 via the I/O section 54. The data input to the output processing section 6 is stored in the memory unit 64 in the output processing section 6 and output from the output unit 66.

That is, the data flows as follows. The data read by the reading section 2 is written in the image memory 50 by the code restoration section 48 via the analog processing section 46. The data in the image memory 50 is then subjected to restoration processing in the code restoration section 48 and stored in the data memory 52. The above processing is code restoration processing.

After this processing, the controller 42 performs reproduction processing such as interleaving, error correction, and header information decoding/determination for the data stored in the data memory 52. The data having undergone the reproduction processing is output to the output processing section 6 to produce a sound from a loudspeaker, display an image on a monitor, or store the data in the memory unit 64. This processing is output processing.

In this case, a general interface is used for the I/O section 54. For example, a GP-IB, RS232C, or SCSI interface, or a PCMCIA interface for a PC is used.

Assume, in the first embodiment, that the data memory 52 is handled as a PCMCIA memory when the output processing section 6 accesses the data memory 52. That is, the controller 62 can read/write data in/from the data memory 52, and the data memory 52 is handled as a PCMCIA memory card, an I/O card, or a hard disk.

Power saving processing in the information reproduction system of the first embodiment will be described next.

Control signals from the controller 42 to the reading section 2, the analog processing section 46, and the code restoration section 48 are signals for designating the start and end of processing performed by each section for power saving processing. Control signals from the controller 42 to the error correction section 44 designate the start of error correction processing and power saving processing. Control signals between the controller 42 and the I/O section 54 designate input/output operations or perform access control for the data memory 52.

A control signal from the analog processing section 46 to the code restoration section 48 is a clock signal or a horizontal or vertical sync signal. Control signals between the code restoration section 48 and the image memory 50 are a read signal, a write signal, and the like. Similarly, control signals from the code restoration section 48 to the data memory 52 are a read signal, a write signal, a partial select signal, and the like.

Figure 2:
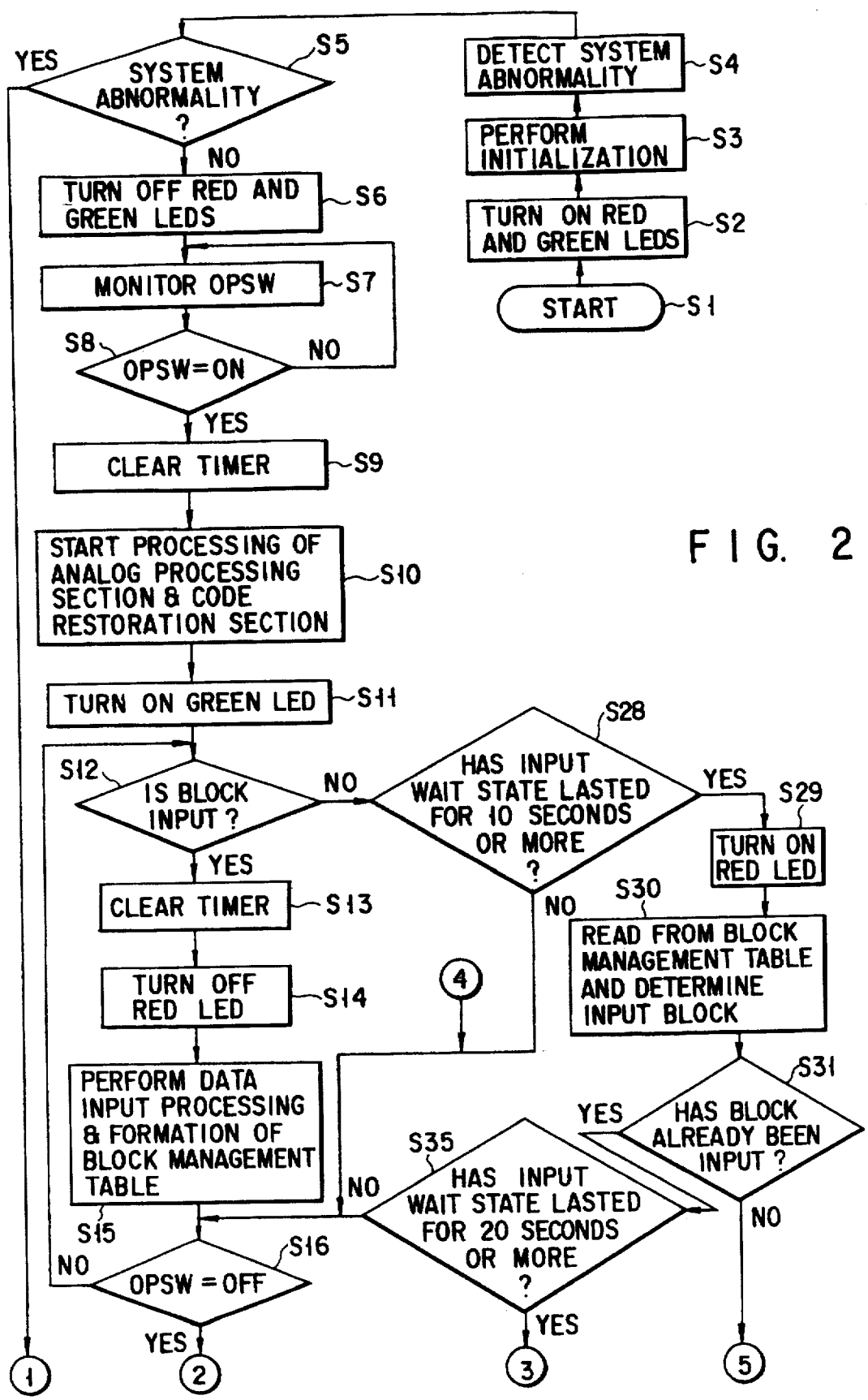
FIG. 2 is a flow chart showing processing performed by a controller 42 as an operation of the information reproduction system of the first embodiment.
Figure 3:
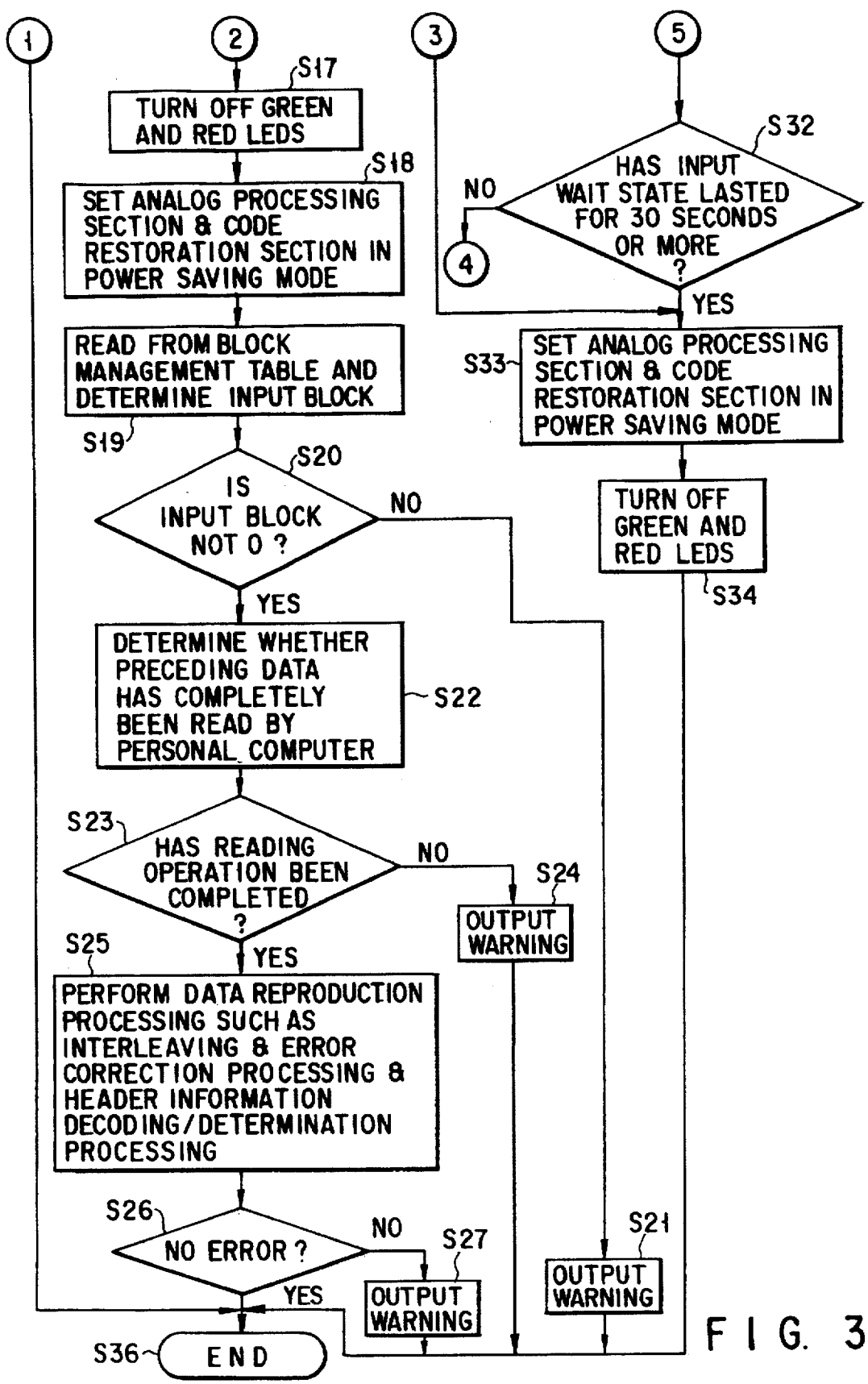
FIG. 3 is a flow chart showing processing performed by the controller 42 as an operation of the information reproduction system of the first embodiment.

FIGS. 2 and 3 are flow charts showing the processing performed by the controller 42 as the operation of the information reproduction system of the first embodiment.

When the power supply is turned on by connecting an AC power supply plug, turning on the power switch, or connecting a battery to the power supply (step S1), both the green and red LEDs 24 and 26 are turned on (step S2). Initialization is then performed (step S3). In this initialization, a memory test, a hardware interface check, and the like are performed.

Subsequently, system abnormality detection is performed (step S4), and the controller 42 checks whether a system abnormality has occurred (step S5). If an abnormality has occurred in the system, the flow jumps to step S36 to terminate the processing. If no abnormality has occurred in the system, both the green and red LEDs 24 and 26 are turned off (step S6).

In detecting a system abnormality, when a hardware interface check is performed and an abnormality is detected, no response may be obtained and the system may be stopped. For this reason, both the green and red LEDs 24 and 26 are turned on at first to notify the operator of an abnormality when the system is stopped. In addition, if an error is detected in checking the memory, the system is stopped, and both the green and red LEDs 24 and 26 are kept on to notify the operator of an abnormality. That is, a system abnormality is determined on the basis of the three states, i.e., the states in which both the green and red LEDs 24 and 26 are turned on and the operation switch 22 is not depressed.

Subsequently, the controller 42 monitors the operation switch 22 (step S7), and checks whether the operation switch 22 is ON (step S8). If the operation switch 22 is OFF, the flow returns to step S7 to repeat the monitoring and determination steps for the operation switch 22 until the switch is turned on.

If the operation switch 22 is turned on, the timer is cleared (step S9), and processing of the analog processing section 46 and the code restoration section 48 is started (step S10). The green LED 24 is then turned on (step S11). This ON state of the green LED 24 indicates that this information reproduction system is started, a pattern code can be read or is being read, and the analog processing section 46 and the code restoration section 48 can perform processing or are performing processing.

The controller 42 checks whether a block is input, i.e., a code constituted by a block is read after the reading section 2 scans on a pattern code (step S12). If a block is input, the timer is cleared (step S13), and the red LED 26 is turned off (step S14). In this case, the red LED 26 is kept off from the start.

At this time, data input processing is progressing in the analog processing section 46 and the code restoration section 48, and data is automatically transferred from the code restoration section 48 to the data memory 52. In this case, the address of the input block is transferred to the controller 42 by, for example, generating an interrupt to the controller 42.

The controller 42 then creates a block management table. This block management table is used to manage, on the basis of block addresses, whether a block address is input (step S15).

The controller 42 checks whether the operation switch 22 is OFF (step S16). If the operation switch 22 is not OFF, the flow returns to step S12 to check again whether a block is input. If the operation switch 22 is OFF, the green and red LEDs 24 and 26 are turned off (step S17), and the analog processing section 46 and the code restoration section 48 are set in the power saving mode (step S18).

The block management table is read out to perform determination processing of the input block (step S19). The controller 42 then checks whether the number of input blocks is 0, i.e., no block is input (step S20). If the number of input blocks is "0", the red LED 26 is flickered twice to perform a warning output operation (step S21). This processing is then terminated (step S36). If the number of input blocks is not "0", i.e., at least one block is input, it is checked whether the PC has completely read the immediately preceding input data (step S23). That is, it is checked whether the PC has read out the data input by the preceding scanning operation from the output buffer of the data memory 52. If the preceding data is not read out, outputting of the preceding data is allowed, and the data input by the current scanning operation is held in the data memory 52. After the preceding data is read out, the data in the data memory 52 is processed. With this operation, outputting of the currently scanned data is also allowed.

If reading of the immediately preceding input data has not been completed, the red LED 26 is flickered four times to perform a warning output operation (step S24), and this processing is terminated (step S36). This warning output operation notifies the operator of the output processing of the data input by the preceding scanning operation. If the reading operation has been completed, data reproduction processing such as interleaving, error correction processing, and decoding/determination processing of header information is performed (step S25).

The controller 42 performs error detection to check whether an error is corrected by error correction processing or the header information includes any error (step S26). If an error is detected, i.e., reproduction cannot be performed, the red LED 26 is flickered three times to perform a warning output operation (step 5 S27), and this processing is terminated (step S36). This warning output operation notifies the operator that a scanning error has occurred in the current scanning operation, there is damage, e.g., a flaw on a code, or logic information such as header information is not compatible with this information reproduction system. If no error is detected, i.e., reproduction can be performed, this processing is immediately terminated (step S36).

Consider a case wherein it is determined in step S12 that no block is input after the reading section 2 is scanned on a pattern code. If no block data is input while the reading section 2 is scanned on a pattern code with the operation switch 22 being depressed, time-out is caused or a warning is output.

If no block is input, it is checked whether an input wait state has lasted for 10 seconds or more (step S28). If the input wait state has not lasted for 10 seconds or more, it is checked again whether the operation switch 22 is OFF (step S16) to wait for inputting of a block. If the input wait state has lasted for 10 seconds or more, the red LED 26 is turned on (step S29) to perform a warning output operation to warn that no block has been input for 10 seconds or more.

Processing is performed to read out the block management table and determine an input block (step S30). The operation switch 22 then checks whether a block has been input (step S31). Note that YES is obtained in step S31 if at least one block was input in the past. If no block has been input, it is checked whether an input wait state has lasted for 30 seconds or more (step S32). If the input wait state has not lasted for 30 seconds or more, it is checked again whether the operation switch 22 is OFF (step S16), and the processing after step S16 is performed. If the input wait state has lasted for 30 seconds or more, time-out is determined, and the analog processing section 46, the code restoration section 48, the error correction section 44, and the like are set in the power saving mode (step S33). The green and red LEDs 24 and 26 are turned off (step S34), and this processing is terminated (step S36). In this case, no code is scanned at all from the start, and the processing is terminated if this state lasts for 30 seconds or more. That is, when the operation switch 22 is kept depressed while the operator has no intention of scanning a code, e.g., the operation switch 22 is unintentionally depressed when the reading section 2 is inserted into a pocket, all processing is terminated to set the power saving mode, thereby prolonging the service time of a battery or the like serving as a power supply.

If it is determined in step S31 that a block has been input, it is checked whether an input wait state has lasted for 20 seconds or more (step S35). If the input wait state has not lasted for 20 seconds or more, it is checked again whether the operation switch 22 is OFF (step S16), and the processing after step S16 is performed. If the input wait state has lasted for 20 seconds or more, time-out is determined and the flow jumps to step S33. The processing from step S33 is then performed, and this processing is terminated (step S36). In this case, since it is determined that the operator has no intention of reproducing a code for 20 seconds, the processing is terminated. This operation is performed to notify, for example, the operator that a scanning operation is interrupted even though the operator intends to scan a code, or the operation switch 22 is kept depressed even though the scanning operation is completed, or some of a plurality of codes to be scanned can be reproduced by this information reproduction system but other codes cannot be reproduced.

In steps S21, S24, and S27 in this flow chart, the green LED 24 is flickered two, four, and three times, respectively, to perform warning output operations. However, the numbers of times of flickering are not limited to these numbers. Any numbers of times can be set as long as the respective states can be discriminated from each other. In addition, instead of discriminating the states on the basis of flickering operations, discrimination may be performed on the basis of ON times or the numbers of display LEDs.

The operation of the controller 62 in the output processing section 6 will be described next.

Figure 4:
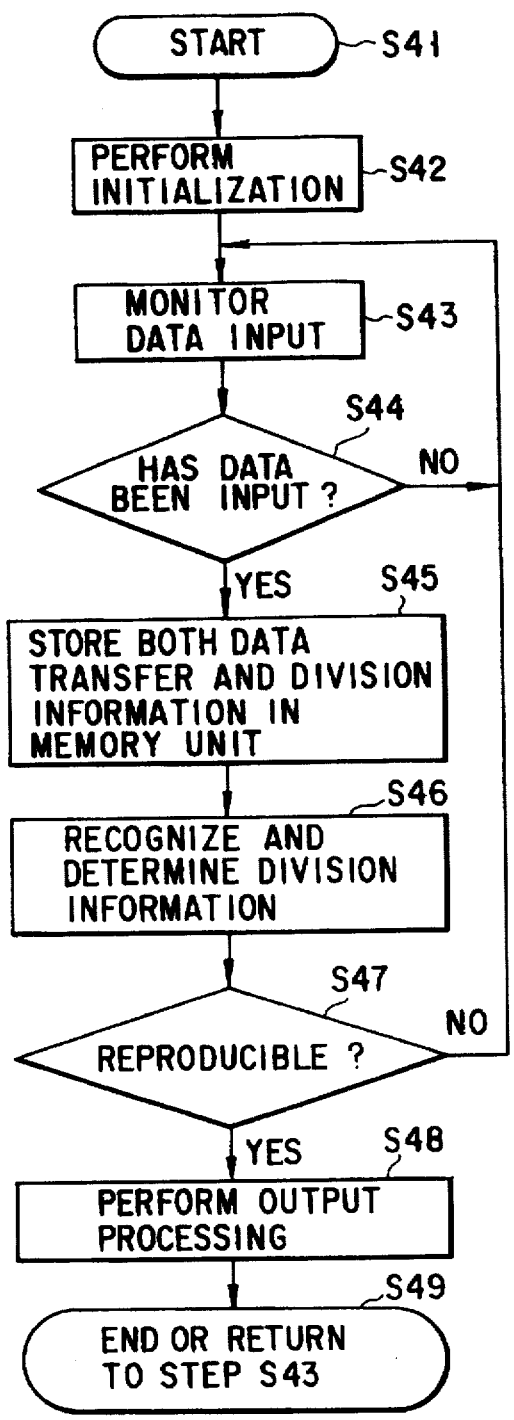
FIG. 4 is a flow chart showing processing performed by a controller 62 as an operation of an output processing section 6.

FIG. 4 is a flow chart showing the processing performed by the controller 62 as the operation of the output processing section 6.

When the power supply is turned on and this processing is started (step S41), initialization is performed (step S42).

The controller 62 monitors writing of reproduction data in the data memory 52 (step S43) to check whether writing of the reproduction data is completed (the data has been input) (step S44). If writing is not completed, the flow returns to step S43 to repeatedly monitor writing of the reproduction data and check whether writing is completed. If writing is completed, the controller 62 reads out the above reproduction data from the data memory 52 and stores division information associated with division of pattern codes in the memory unit 64 (step S45). The division information will be described later.

Recognition/determination processing of the above division information is performed (step S46) to check whether reproduction can be performed (step S47). If it is determined that reproduction cannot be performed, the flow returns to step S43 to monitor writing of the reproduction data again. This processing is determination processing to be performed to perform an output operation when the block data of all pattern codes are input in a case wherein the pattern codes are divided. Information for this processing is recorded on each pattern code. If it is determined that reproduction can be performed, output processing, e.g., outputting of a sound or image, is performed (step S48).

Subsequently, this processing is terminated, or the flow returns to step S43 to perform data input monitoring (step S49).

FIGS. 5A, 5B, 6A, and 6B are timing charts in the operation of the information reproduction system of the first embodiment.

These timing charts mainly show the relationship between the operation performed by the operator, the operation of the data processing section 4, and the LEDs 24 and 26 of the reading section 2. Referring to FIGS. 5A to 6B, "OPERATION" indicates the operation performed by the operator, i.e., the ON/OFF operations of the operation switch 22 and the power supply, and scanning of the reading section 2 on a pattern code; "PROCESSING", the operations of the data processing section 4 and the output processing section 6; and "DISPLAY", the flickered states of the green and red LEDs 24 and 26 of the reading section 2.

The timing charts in FIGS. 5a to 6B will be sequentially described below.

Figure 5A:
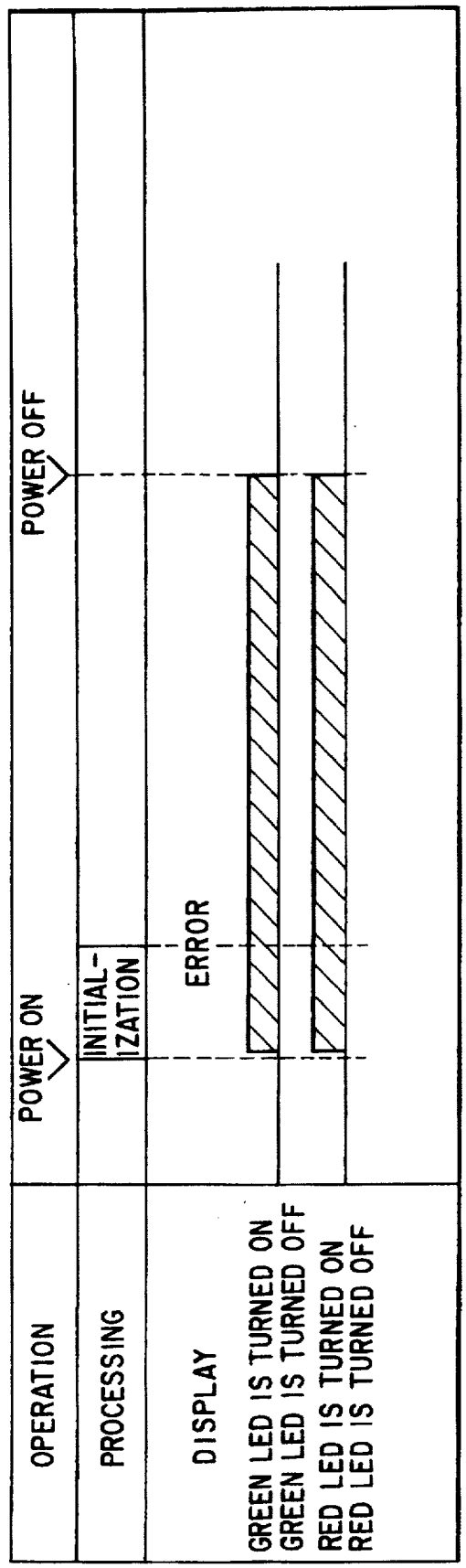
FIGS. 5A and 5B are timing charts in an operation of the information reproduction system of the first embodiment.

FIG. 5A is a timing chart showing a case wherein a system abnormality is detected in the initialization processing in step S2 in the flow chart in FIG. 2.

As shown in FIG. 5A, when the power supply is turned on ("OPERATION"), initialization processing is performed ("PROCESSING"). If an abnormality is detected in the system ("ERROR"), "PROCESSING" is terminated. In this case, the green and red LEDs 24 and 26 are turned on ("DISPLAY") while the power supply is kept on. Since the abnormality is detected in the system in the initialization processing, both the LEDs 24 and 26 are kept on. When the power supply is turned off ("OPERATION"), both the LEDs 24 and 26 are turned off.

Figure 5B:
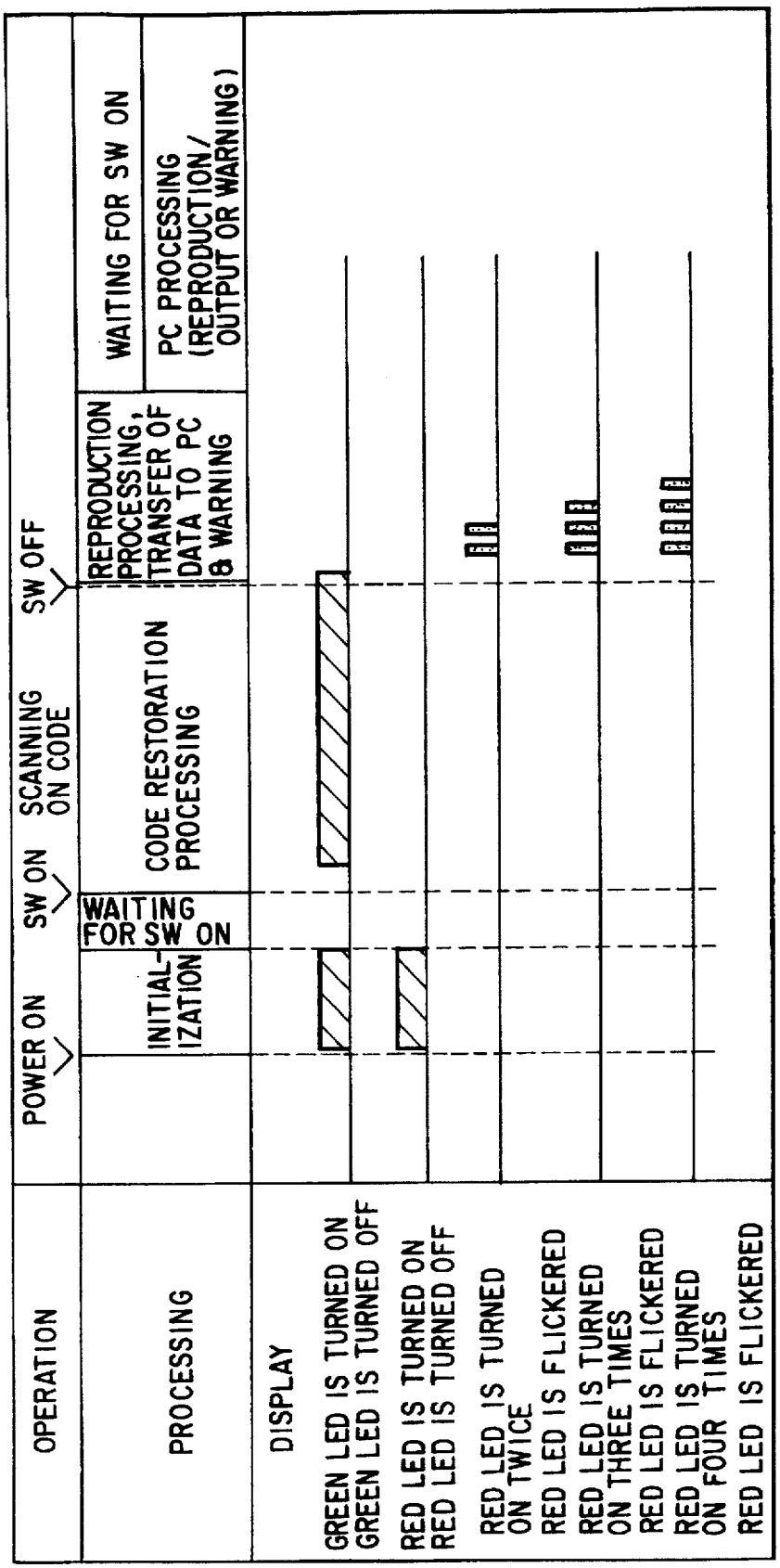

FIG. 5B is a timing chart showing a basic operation to be performed when it is determined in step S12 in the flow chart in FIG. 2 that block data is input.

As shown in FIG. 5B, when the power supply is turned on ("OPERATION"), initialization processing is performed ("PROCESSING"). When no system abnormality is detected and the processing is normally terminated, the flow waits until the operation switch 22 is turned on. The green and red LEDs 24 and 26 are turned on while the power supply is kept on ("DISPLAY"). When the initialization processing of the system is normally terminated, both the LEDs 24 and 26 are turned off. That is, the green and red LEDs 24 and 26 are kept on during the initialization processing, and are turned off when the initialization processing is terminated.

Subsequently, the operation switch 22 is turned on to scan a pattern code ("OPERATION"). In this case, code restoration processing is performed ("PROCESSING") while the operation switch 22 is kept on, and the green LED 24 is turned on ("DISPLAY") while the operation switch 22 is kept on.

When the operation switch 22 is turned off ("OPERATION"), reproduction processing is performed ("PROCESSING"), and reproduction data is transferred to the PC of the output processing section 6, or a warning is output. Thereafter, the flow waits until the operation switch 22 is turned on, and the reproduction data or a warning is output (PC processing). The green LED 24 is turned off ("DISPLAY") while the operation switch 22 is kept off. If no block is input, the red LED 26 is flickered twice, as described above with reference to the flow chart in FIG. 3. If input block data cannot be reproduced, the red LED 26 is flickered three times. If the reading operation is not completed and reproduction processing cannot be further performed, the red LED 26 is flickered four times.

Figure 6A:
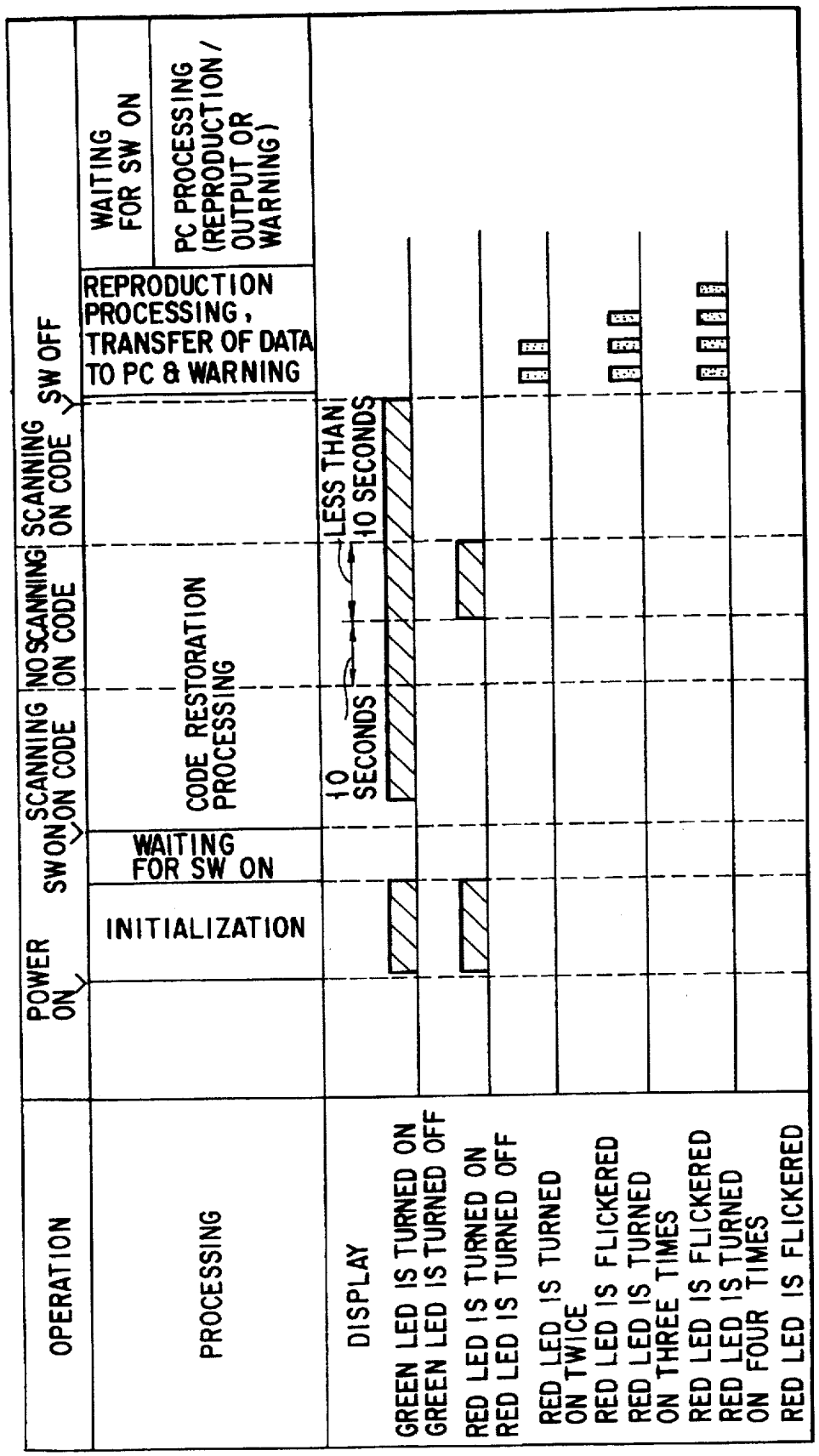
FIGS. 6A and 6B are timing charts in an operation of the information reproduction system of the first embodiment.

FIG. 6A is a timing chart showing an operation to be performed when block data is input after step S35 in the flow chart in FIG. 2.

As shown in FIG. 6A, when the power supply is turned on ("OPERATION"), initialization processing is performed ("PROCESSING"). If no system abnormality is detected, and the processing is normally terminated, the flow waits until the operation switch 22 is turned on. The green and red LEDs 24 and 26 are turned on while the power supply is kept on ("DISPLAY"). When the initialization processing of the system is normally terminated, both the LEDs 24 and 26 are turned off. That is, the green and red LEDs 24 and 26 are turned on during the initialization processing, and are turned off after the initialization processing.

Subsequently, the operation switch 22 is turned on ("OPERATION"), and a pattern code is scanned. At this time, code restoration processing is performed while the operation switch 22 is kept on ("PROCESSING"). The green LED 24 is turned on while the operation switch 22 is kept on ("DISPLAY").

After the pattern code is scanned ("OPERATION"), the red LED 26 is turned on ("DISPLAY") 10 seconds after the end of the scanning operation. When the pattern code is scanned and the block is input before 10 seconds elapse from the above operation, i.e., 20 seconds elapse from the end of the scanning operation, the red LED 26 is turned off, and only the green LED 24 is kept on.

When the operation switch 22 is turned off ("OPERATION"), reproduction processing is performed ("PROCESSING"), and the reproduction data is transferred to the PC of the output processing section 6 or a warning is output. After this operation, the flow waits until the operation switch 22 is turned on, and the reproduction data or a warning is output ("PC processing"). The green LED 24 is then turned off while the operation switch 22 is kept off ("DISPLAY"). As described above with reference to the flow chart in FIG. 3, the red LED 26 is flickered two times if no block is input; three times if input block data cannot be reproduced; and four times if the reading operation is not completed and reproduction processing cannot be further performed.

According to this timing chart, when the operator turns on the operation switch 22 to scan a pattern code, block data is input. If no block is input upon scanning on a pattern code within 10 seconds after the operation, the red LED 26 is turned on as an warning to urge the operator to input a block by scanning the pattern code.

This warning is output when no block data is input upon scanning on a pattern code. That is, the case wherein no block data is input includes not only a case wherein no pattern code is scanned but also a case wherein a scanned pattern code is not recognized as block data, e.g., a case wherein the format of the pattern code is different from that of a pattern code which can be restored by this information reproduction system or a portion including no pattern code is scanned.

Referring to FIG. 6A, "NO SCANNING ON CODE" in "OPERATION" indicates that no pattern code which can be read is scanned. The above warning instructs the operator to scan a proper pattern code.

Figure 6B:
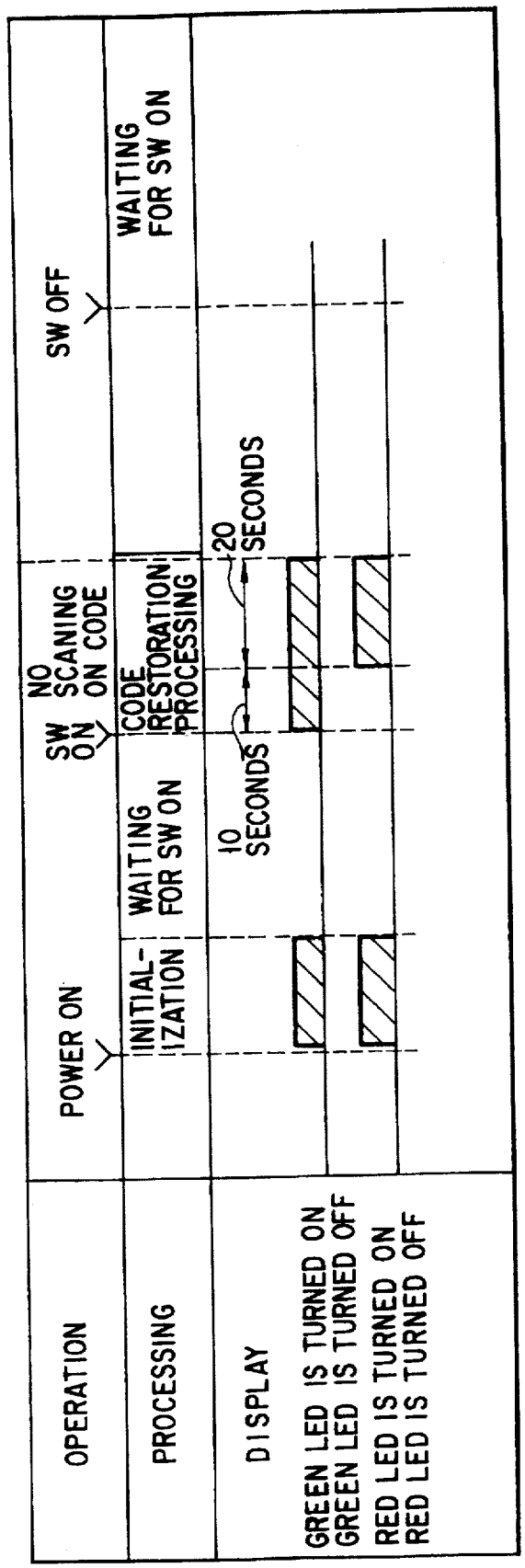

FIG. 6B is a timing chart showing an operation to be performed in a case wherein the input wait state has lasted for 30 seconds or more in step S32 in the flow chart in FIG. 3, and no block data is input.

As shown in FIG. 6B, when the power supply is turned on ("OPERATION"), initialization processing is performed ("PROCESSING"). If no system abnormality is detected and the processing is normally terminated, the flow waits until the operation switch 22 is turned on. The green and red LEDs 24 and 26 are turned on while the power supply is kept on ("DISPLAY"). If the initialization processing of the system is normally terminated, both the LEDs 24 and 26 are turned off. That is, the green and red LEDs 24 and 26 are turned on during the initialization processing and turned off at the end of the initialization processing.

The operation switch 22 is turned on ("OPERATION"), but no pattern code is scanned. At this time, code restoration processing is performed while the operation switch 22 is kept on ("PROCESSING"), and the green LED 24 is turned on while the operation switch 22 is kept on ("DISPLAY"). The red LED 26 is turned on 10 seconds after the operation switch 22 is turned on. Since no pattern code is scanned for 20 seconds after the above operation, i.e., before 30 seconds elapse since the operation switch 22 is turned on, the code restoration processing is terminated ("PROCESSING"), the green and red LEDs 24 and 26 are turned off to perform power saving processing, and the processing is terminated.

According to this timing chart, if no block data is input upon scanning on a pattern code within 10 seconds after the operation switch 22 is turned on, the red LED 26 is turned on as a warning to urge the operator to input block data by scanning on the pattern code. If no block data is input within 20 seconds after this warning, the green and red LEDs 24 and 26 are automatically turned off to save power. Power saving processing is performed in this manner, and the processing is terminated.

Note that this warning is output when no block data is input even if pattern code is scanned. Similar to the description given with reference to FIG. 6A, the case wherein no block data is input includes not only the case wherein no pattern code is scanned but also the case wherein a scanned pattern code is not recognized as block data, e.g., the format of the pattern code is different from that of a pattern code which can be restored by this information reproduction system, a portion including no pattern code is scanned, or the operation switch 22 is turned on when the reading section 2 falls without any intention of scanning a pattern code.

"NO SCANNING ON CODE" indicates that no pattern code which can be read is scanned. The above warning instructs the operator to scan a proper pattern code. Note that delays in "DISPLAY", i.e., ON/OFF operations of the green and red LEDs 24 and 26, with respect to "OPERATION" and "PROCESSING" are time lags caused in actual operations.

The memory map of the data memory 52 constituting the information reproduction system of the first embodiment will be described next.

FIGS. 7A and 7B show the memory map of the data memory 52.

FIG. 7A shows the overall memory map of the data memory 52. FIG. 7B shows the block management table in the memory map.

The data memory 52 is constituted by a block data area 70, an output buffer 72, and a block management table 74.

The capacity of the data memory 52 is assumed to be 64 Kbytes=65,536 bytes. Of this capacity, 32 Kbytes=32,768 bytes are assigned as the block data area 70; (32,768−4,096) =28,672 bytes, as the output buffer 72; and 4,096 bytes, as the block management table 74.

In the output buffer 72, reproduction data having undergone error correction, i.e., a subset, is written. "Subset" is a unit of reproduction data which can be output (reproduced), e.g., sound data, text data, image data, or a combination thereof.

Block data restored by the code restoration section 48 are written one by one at addresses of the block data area 70 of the memory map, which correspond to the block addresses. That is, block addresses 1, 2, and 3 represent predetermined addresses on the block data area 70, and a data area is prepared for each block address, in which data is written.

The area of the output buffer 72 is slightly smaller than the block data area 70. Since block data is written in the output buffer 72 upon removal of error correction codes and the like, the amount of written data decreases. For this reason, even if the area of the output buffer 72 is slightly smaller than the block data area 70, no problem is posed.

In this case, the data amount of one block data is 256 bytes. Since the block data area 70 is 32 Kbytes, a total of 128 block data can be stored.

The block management table 74 is used to determine whether block data is input. Therefore, it suffices if a 1-bit area is prepared for one block address. That is, a 128-bit data area is sufficient for one-to-one management of 128-block information. In this case, a 4,096-byte area is ensured. Of this area, a 128-byte area may be used.

More specifically, the data memory 52 includes the block data area 70 in which each block data of reproduction data is assigned to a corresponding address, the output buffer 72 which is temporarily used to output reproduction data stored in the block data area 70, and the block management table 74 which indicates the presence/absence of block data. The block management table 74 has areas in one-to-one correspondence with the block addresses. With the block data area 70 assigned in one-to-one correspondence with the block addresses, the operator cannot only scan the reading section 2 regularly on codes but also scan it irregularly. Although the addresses of input blocks are input irregularly upon irregular scanning, since each area of the block data area 70 is assigned to a corresponding block, reproduction can be performed. In addition, since the data memory 52 includes the output buffer 72 separately from the block data area 70, the memory can hold data obtained by two scanning operations.

Division information associated with division of pattern codes will be described next.

Figure 8A:
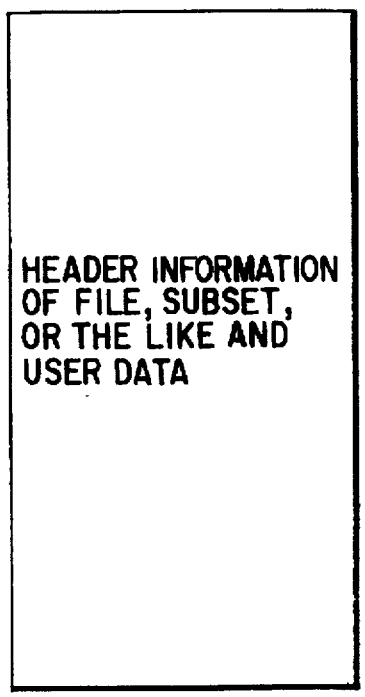
FIG. 8A is a view for explaining a pattern code and user data.

FIG. 8A is a view for explaining a pattern code and user data.

In an information recording system capable of creating a pattern code, each pattern code is recorded in one file form upon addition of header information to information such as sound, text, or image information (to be referred to as user data hereinafter).

In this information reproduction system, according to the sizes of the block data area 70 and the output buffer 72 on the data memory 52, 128 block data as a pattern code in the above file form can be stored. In other words, only 128 block data can be reproduced.

Division of pattern codes is a technique of reproducing user data larger than 128 block data. This technique will be described below.

Figure 8B:
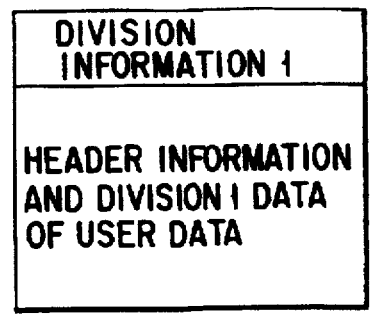
FIGS. 8B to 8D are views showing division information 1 to division information 3.
Figure 8C:
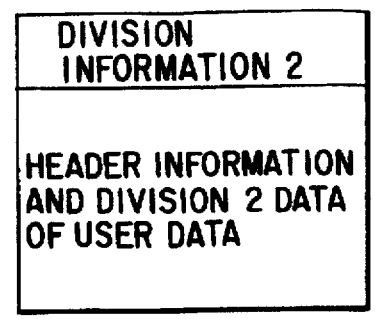
Figure 8D:
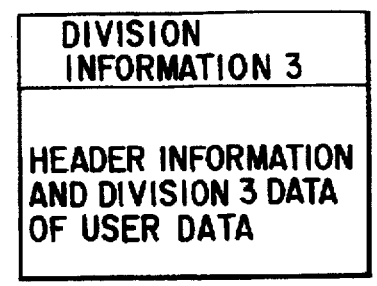

As described above, if user data is larger than 128 block data, the reproduction data is larger than the block data area 70 and the output buffer 72. Therefore, this data cannot be reproduced by this information reproduction system. For this reason, as shown in FIGS. 8B to 8D, the user data is divided into division information 1, division information 2, and division information 3, and header information is added to each divided user data. As this header information, information indicating that the user data is divided is recorded together with information for coupling each user data. In the information recording system, division information 1, division information 1, division information 2, and division information 3 are patterned/imaged to create three pattern codes like those shown in FIGS. 8E to 8G.

Figure 8E:
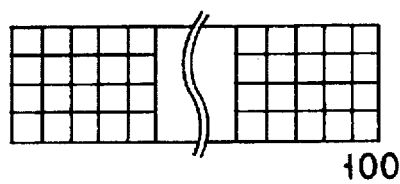
FIGS. 8E to 8G are views showing pattern codes formed by patterning/imaging division information 1 to division information 3.
Figure 8F:
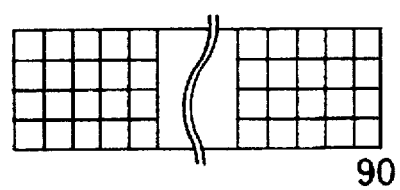
Figure 8G:
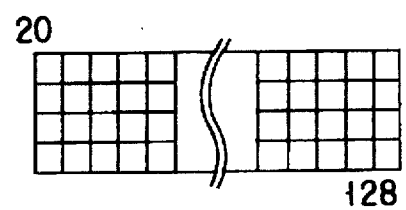

When the pattern codes created from the division information are to be reproduced in this information reproduction system, the three codes are sequentially scanned. More specifically, the operation switch 22 is turned on to scan the pattern code in FIG. 8E. The operation switch 22 is then turned off. Subsequently, the operation switch 22 is turned on to scan the pattern code in FIG. 8F. The operation switch 22 is then turned off. Subsequently, the operation switch 22 is turned on to scan the pattern code in FIG. 8G. The operation switch 22 is then turned off. Scanning is performed three times in the above manner to reproduce the codes. In the above case, the pattern codes in FIGS. 8E to 8G are scanned in this order. However, the above three scanning operations can be performed in an arbitrary order as long as another pattern code is not scanned while the above three pattern codes are scanned.

This information reproduction system is capable of reproducing only 128 blocks. For this reason, the pattern code in FIG. 8E is scanned to perform reproduction processing in the block data area 70 of the data memory 52, and the resultant data is stored in the output buffer 72 after it is stored in the block data area 70. This data in the output buffer 72 is immediately transferred to the output processing section 6. At the next moment, the next pattern code in FIG. 8F is scanned. At this time, since the block data area 70 is empty, the block data of the pattern code in FIG. 8F is stored therein. This block data is also processed and transferred from the output buffer 72 to the output processing section 6. In this manner, the block data of the respective pattern codes are sequentially transferred to be linked and output from the output processing section 6.

As indicated by the flow chart in FIG. 4 showing the processing in the controller 62 of the output processing section 6, the controller 62 of the output processing section 6 determines, on the basis of the division information of the block data input from one pattern code, whether all the three block data, in the case shown in FIGS. 8A to 8G, are input. If all the three block data are input, output processing is performed, and the processing is terminated.

With this operation, the size of information which can be reproduced with the capacity of the data memory 52 of this information reproduction system, i.e., the size of user data, is not limited, and hence larger information can be created.

Note that "1" in FIG. 8E is the smallest block address number of a pattern code at which data is stored, and "100" is the largest block address number of a pattern code at which data is stored. Similarly, "1" and "90" in FIG. 8F are the smallest block address number of a pattern code and the largest block address number of a pattern code, respectively, so are "20" and "128" in FIG. 8G. This information reproduction system can reproduce data between any start block address number and any end block address number.

A pattern code created from division information is a subset as the minimum unit which can be output. This subset may be image data, text data, sound data, or the like as one unit which can be output, or a combination of image data, text data, sound data, and the like as one unit which can be output.

The relationship between the operation of the operation switch 22 and the processing to be performed by the controller 42 of the data processing section 4 will be described next. The following flow charts indicate the relationship between the operation of the operation switch 22 and the processing performed by the controller 42 in consideration of human engineering, and mainly show the portions of the processing (in the flow charts in FIGS. 2 and 3) performed by the controller 42 of the data processing section 4, which portions are based on the operation of the operation switch 22.

Figure 9:
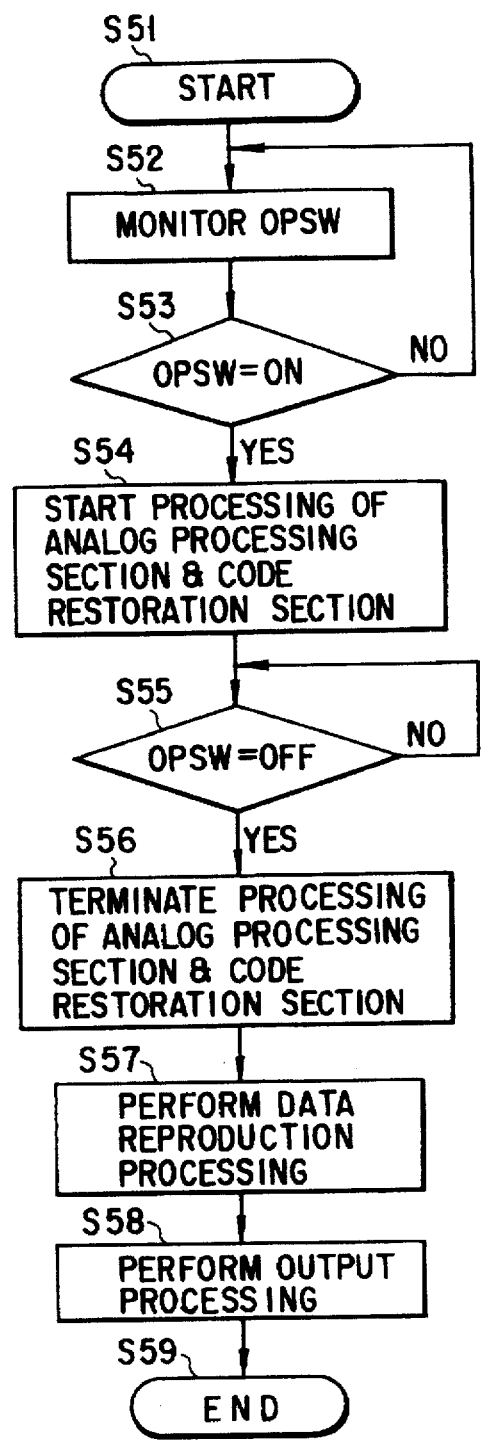
FIG. 9 is a flow chart showing processing in which a pattern code is scanned while an operation switch 22 is kept depressed, and the resultant data is output when the switch is released.

FIG. 9 is a flow chart showing processing in which a pattern code is scanned while the operation switch 22 is kept depressed, and the read data is output when the operation switch 22 is released.

When the power supply is turned on (step S51), the controller 42 monitors the operation switch 22 (step S52) and checks whether the operation switch 22 is ON (step S53). If the operation switch 22 is OFF, the flow returns to step S52 to repeat monitoring/determination steps for the operation switch 22 until the operation switch 22 is turned on.

When the operation switch 22 is turned on, the controller 42 causes the analog processing section 46 and the code restoration section 48 to start processing (step S54).

The controller 42 checks whether the operation switch 22 is OFF (step S55). If the operation switch 22 is not OFF, the controller 42 repeats the determination in step S55. When the operation switch 22 is turned off, the controller 42 causes the analog processing section 46 and the code restoration section 48 to end the processing (step S56).

Subsequently, the controller 42 performs data reproduction processing (step S57), outputs the resultant data (step S58), and terminates this processing (step S59).

In the operation of the operation switch 22 according to this flow chart, a pattern code is scanned while the operation switch 22 is kept depressed, and the operation switch 22 is released after the scanning operation. This operation is simple and easy. In addition, if a switch signal at this time is used as a control signal for power saving processing, power saving processing can be easily performed, and the circuit required for this processing can be simplified.

Figure 10:
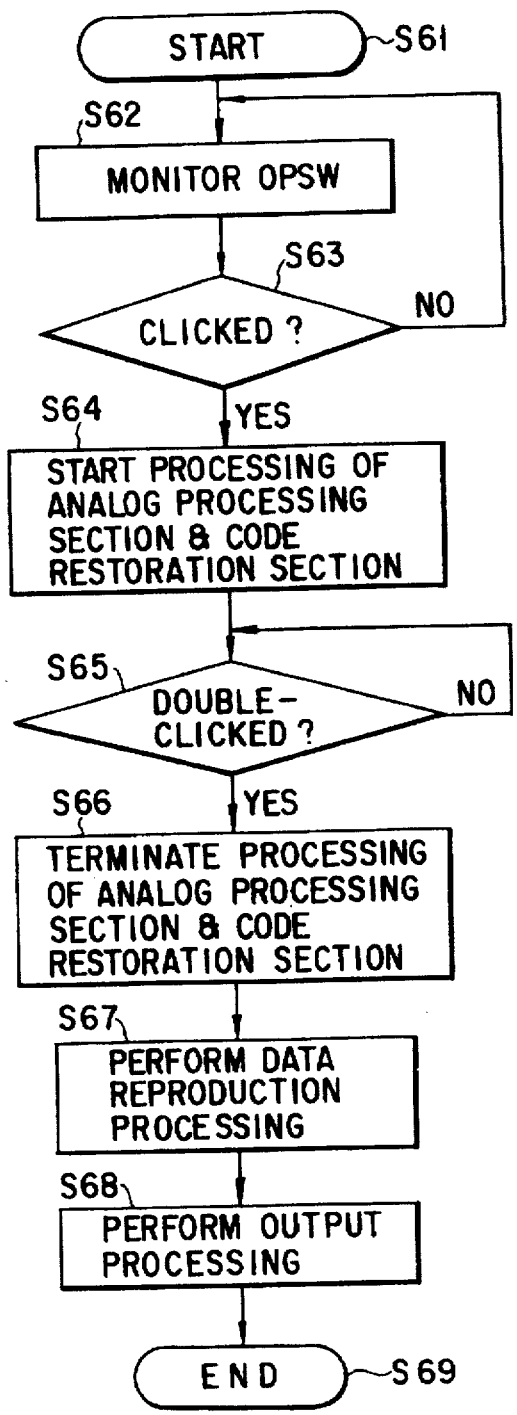
FIG. 10 is a flow chart showing processing in which a pattern code is scanned and the resultant data is output by clicking the operation switch 22.

FIG. 10 is a flow chart showing processing in which the operation switch 22 is clicked to scan a pattern code and output the read data. In this case, a clicking operation is a series of operations of turning on the operation switch 22 and turning off it in a short period time.

When the power supply is turned on (step S61), the controller 42 monitors the operation switch 22 (step S62) and checks whether the operation switch 22 is clicked (step S63). If the operation switch 22 is not clicked, the flow returns to step S62 to repeat monitoring/determination steps for the operation switch 22 until the operation switch 22 is clicked. In this case, "the operation switch 22 is clicked" indicates that the operation switch 22 is clicked once.

When the operation switch 22 is clicked, the controller 42 causes the analog processing section 46 and the code restoration section 48 to start processing (step S64).

The controller 42 checks whether the operation switch 22 is double-clicked (W-clicked) (step S65). If the operation switch 22 is not double-clicked, the controller 42 repeats the determination in step S65. When the operation switch 22 is double-clicked, the controller 42 causes the analog processing section 46 and the code restoration section 48 to terminate the processing (step S66). In this case, "the operation switch 22 is double-clicked (W-clicked)" indicates that the operation switch 22 is clicked twice.

Subsequently, the controller 42 performs data reproduction processing (step S67), outputs the resultant data (step S68), and terminates this processing (step S69).

According to this flow chart, the operation switch 22 is clicked to start scanning a pattern code, and is double-clicked (W-clicked) after the scanning operation to terminate the operation. That is, the operator need not simultaneously perform two operations, i.e., depressing the operation switch 22 and scanning the pattern code. For this reason, the operator can concentrate on one operation, i.e., scanning the pattern code, thereby preventing a shake of the reading section 2 and the like.

The purpose in clicking the operation switch 22 different numbers of times, i.e., once and twice, is to discriminate the start and end of a scanning operation. These numbers of times of clicking can be arbitrarily set as long as different number of times are set.

Figure 11:
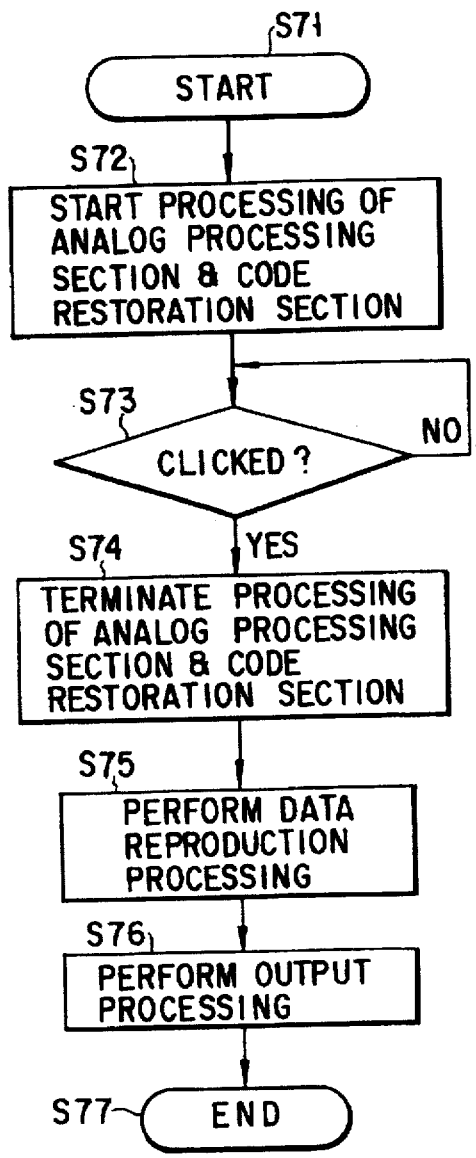
FIG. 11 is a flow chart showing processing in which an output operation is performed by clicking the operation switch 22.

FIG. 11 is a flow chart showing processing in which the operation switch 22 is clicked to output data.

When the power supply is turned on (step S71), the controller 42 causes the analog processing section 46 and the code restoration section 48 to start processing (step S72).

The controller 42 then checks whether the operation switch 22 is clicked (step S73). If the operation switch 22 is not clicked, the controller 42 repeats the determination in step S73. When the operation switch 22 is clicked, the controller 42 causes the analog processing section 46 and the code restoration section 48 to terminate the processing (step S74). In this case, the processing in the analog processing section 46 and the code restoration section 48 need not be terminated, and the data which has been read by the time the operation switch 22 was clicked may be subjected to data reproduction processing and output.

Subsequently, data reproduction processing is performed (step S75), and the resultant data is output (step S76). This processing is then terminated (step S77). Note that the processing need not be terminated at this time, and the flow may return to the start (step S71). In this case, the processing in the analog processing section 46 and the code restoration section 48 need not be terminated, and the data which has been read by the time the operation switch 22 was clicked may be subjected to data reproduction processing and output.

In the operation of the operation switch 22 according to this flow chart, if, for example, the data processing section 4 having the analog processing section 46 and the code restoration section 48 uses an AC power supply or the like and hence need not perform power saving processing, the operator may output data by only performing a clicking operation, and can read block data regardless of the timing of scanning of a pattern code. The operator only needs to designate the output timing.

FIG. 12 is a flow chart showing a processing in which the start of scanning of a pattern code is recognized with a bottom switch of the operation switch 22, and data is output.

In this case, the bottom switch (BSW) (not shown) is a switch capable of detecting that the bottom of the reading section 2 is brought into contact with a paper surface, or detecting that the reading section 2 is present on a pattern code, or detecting that scanning is started. That is, the bottom switch is a switch for recognizing that the reading section 2 is brought near to a pattern code so that the section can read the code. As such a switch, a switch constituted by vibration sensor, a switch for detecting pressure, an optical switch for performing detection on the basis of optical reflection on a pattern code, and the like may be used.

When the power supply is turned on (step S81), the controller 42 monitors the operation switch 22 (step S82) and checks whether operation switch 22 is ON (step S83). If the operation switch 22 is OFF, the flow returns to step S82 to repeat the monitoring and determination steps for the operation switch 22 until the operation switch 22 is turned on.

When the operation switch 22 is turned on, the controller 42 checks again whether the operation switch 22 is OFF (step S84). If the operation switch 22 is OFF, output processing is performed (step S90), and this processing is terminated (step S91).

If it is determined in step S84 that the operation switch 22 is not OFF, the controller 42 checks whether the bottom switch (BSW) is ON (step S85). If the bottom switch is not ON, the flow returns to step S84 to repeat the determination processing for the operation switch 22 and the bottom switch until the bottom switch is turned on. When the bottom switch is turned on, the controller 42 causes the analog processing section 46 and the code restoration section 48 to start processing (step S86).

The controller 42 checks whether the bottom switch is OFF (step S87). If the bottom switch is not OFF, the controller 42 repeats the determination processing in step S87. When the bottom switch is turned off, the controller 42 causes the analog processing section 46 and the code restoration section 48 to terminate the processing (step S88).

Subsequently, data reproduction processing (step S89) is performed, and the flow returns to step S84 to perform the above processing from step S84.

According to this flow chart, scanning of a pattern code is started when the operation switch 22 and the bottom switch are turned on, the scanning operation is terminated when the bottom switch is turned off, and the data obtained at the end of the scanning operation is partly reproduced. Since the analog processing section 46 and the code restoration section 48 perform processing only in the interval between the ON and OFF states of the bottom switch, power saving processing and performed except for a scanning period. In addition, when the bottom switch is turned off, i.e., when a scanning operation is terminated, the read block data is subjected reproduction processing. For this reason, the data reproduction time from the time the operation switch 22 is turned off can be saved, and hence the time required to output, e.g., sound or image data from the time the operation switch 22 is turned off can be shortened.

Note that in the above data reproduction processing, the block data obtained in the preceding processing is subjected to error correction or the like, and only data which can be corrected is transferred to the output buffer 72.

A pattern code to be reproduced by an information reproduction system according to the second embodiment of the present invention will be described next.

FIGS. 13A and 13B show the arrangements of sheets of multimedia paper used in the information reproduction system. Note that multimedia paper (to be referred to as MMP hereinafter) is a sheet on which pattern codes are recorded.

As shown in FIG. 13A, an MMP 80 is constituted by a picture or photograph 82, characters (text) 84, and pattern codes 86, 86a, and 86b. These pattern codes include the pattern code 86a having no repetitive block addresses, and the pattern code 86b having repetitive block addresses, as shown in FIG. 13B.

FIG. 14A shows one file of a pattern code.

This file contains multimedia information constituted by character information, speech information, picture information, and the like. These pieces of information can be output by scanning the pattern code.

Assume that this pattern code contains speech information "This is a pen". In this case, as described above, the utterance "This is a pen" is output by scanning the pattern code once.

The user may wish to repeatedly reproduce only a portion of the speech information, e.g., "This", or reproduce only the speech information of multimedia information containing character information, speech information, picture information, and the like. A pattern code for realizing this operation according to the second embodiment will be described below with reference to FIG. 14B.

As shown at the upper portion in FIG. 14B, a pattern code having no repetitive block address data is recorded such that the speech information "This" is recorded from address 1 to address 50; the speech information "is", from address 51 to address 70; the speech information "a", from address 71 to address 80; and the speech information "pen", from address 81 to address 100.

With this pattern code, for example, only the utterance "This" can be reproduced by scanning from address 1 to address 50, and only the utterance "pen" can be reproduced by scanning from address 81 to address 100. Note that the whole information can be reproduced by scanning from address 1 to address 100 at once.

In addition, as shown at the lower portion in FIG. 14B, a pattern code having no repetitive block address data is recorded such that character information is recorded from address 1 to address 40; speech information, from address 41 to address 80; and picture or photograph information, from address 81 to address 120.

With this pattern code, only the characters can be reproduced by scanning from address 1 to address 40, and only the picture or photograph can be reproduced by scanning from address 81 to address 120. Note that the whole information can be reproduced by scanning from address 1 to address 120 at once.

That is, by arranging information without repeating block address data, only a subset as a unit which can be reproduced, e.g., a portion of multimedia information or character information, can be reproduced, and the whole information can be reproduced as one file.

In addition, the block data on the start array (address 1) and the end array (address 50) of the block data from address 1 to address 50, at which "This" is recorded, are recorded as dummy block data. Alternatively, the block data on the end array (address 50) is made identical to the succeeding block data.

With this arrangement, the allowable range in a scanning operation can be expanded with respect to a shake of the reading section 2 and the like. Even if the positioning of the reading section 2 is slightly rough in a scanning operation, block data can be read.

In addition, the word "character" is written below the pattern code from address 1 to address 40, at which the character information is recorded, the word "speech" is written below the pattern code from address 41 to address 80, at which the speech information is recorded, and the word "picture (photograph)" is written below the pattern code from address 81 to address 120, at which the picture or photograph information is recorded.

By clarifying the contents of data recorded in each pattern code and the type of information in this manner, i.e., writing a corresponding word around each of the above pattern codes, the operator can quickly reproduce only desired information.

Figure 15A:
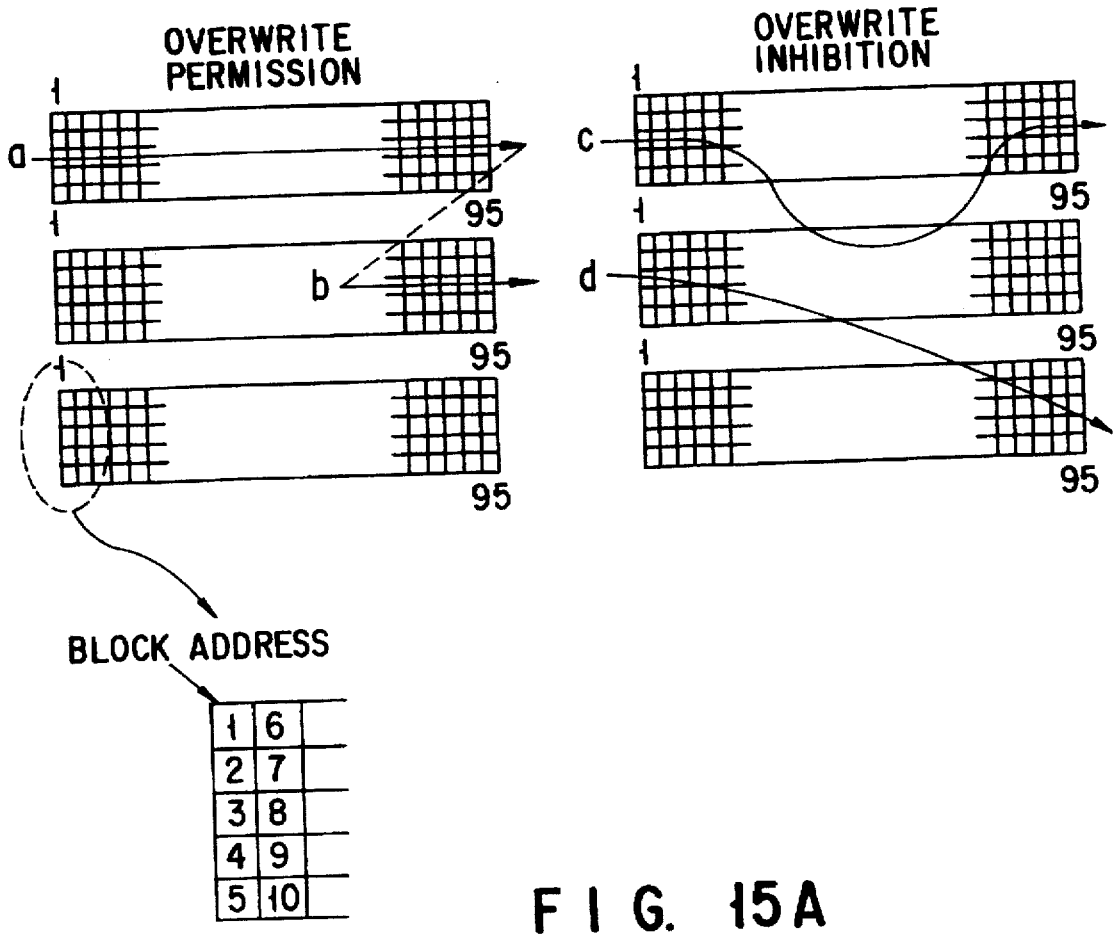
FIGS. 15A and 15B are views for explaining pattern codes according to the third embodiment.
Figure 15B:
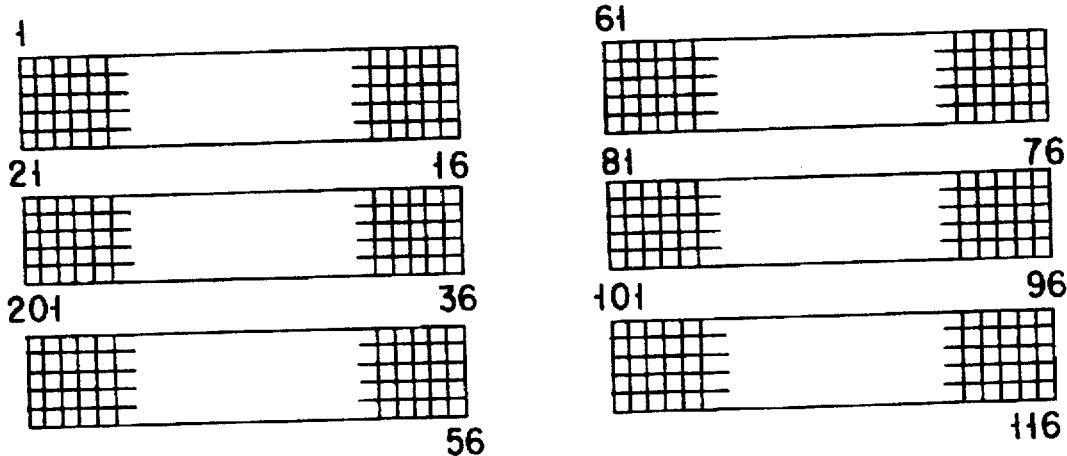

FIGS. 15A and 15B are views for explaining pattern codes according to the third embodiment. In this embodiment, pattern codes are arranged at a high density.

Assume that the pattern codes shown in FIG. 15A are independent files which are not specifically related to each other, and are arranged at a high density.

In this state, in an overwrite permission state, i.e., a state in which the block data of the address data of a block which has been scanned latest is read as block data, the reading section 2 may touch a pattern code adjacent to a desired pattern code in the process of scanning. Since the address data of the block which has been scanned latest is preferentially read, undesired block data is read, and the desired block data cannot be reproduced.

In an overwrite inhibition state, i.e., a state in which the block data of the address data of a block which has been scanned first is read as block data, since pattern codes are adjacent to each other, the reading section 2 may touch an undesired pattern code adjacent to the desired pattern code in the first scanning operation. Since the address data of the block which has been scanned first is preferentially read, the undesired block data may be read even if the operator recognizes a scanning error and scans the desired code again without performing an output operation. As a result, the desired block data may not be reproduced.

In order to prevent the above inconvenience, adjacent pattern codes are designed not to have repetitive block address data.

FIG. 15B show pattern codes according to the third embodiment. When the block address data of a given pattern code consists of address 1 to address 16, the block address data of an adjacent pattern code below the given pattern code consists of address 21 to address 36. In addition, the block address data of an adjacent pattern code on the right side of the given pattern code consists of address 1 to address 76.

In this manner, adjacent pattern codes are made to have different address data even if the pattern codes are different files. With this arrangement, the allowable range in a scanning operation can be expanded with respect to a shake of the reading section 2 and the like.

A pattern code according to the fourth embodiment will be described next. In this embodiment, a pattern code as one subset which is arranged over several lines is scanned.

Even a pattern code as one subset which should be scanned at once may be recorded over several lines depending on the layout or the like.

In addition, a subset may be divided into certain information units, and the pattern code of each information unit may be recorded over several lines. In this case, the pattern code on one line is scanned at once to be read, and this scanning operation is repeated a corresponding number of times.

In both the cases described above, the pattern codes are recorded, as visually identical codes, on a recording medium, and hence the operator cannot discriminate the scanning forms.

Pattern codes according to the fourth embodiment which notify the operator of the difference between the scanning forms will be described below.

Figure 16A:
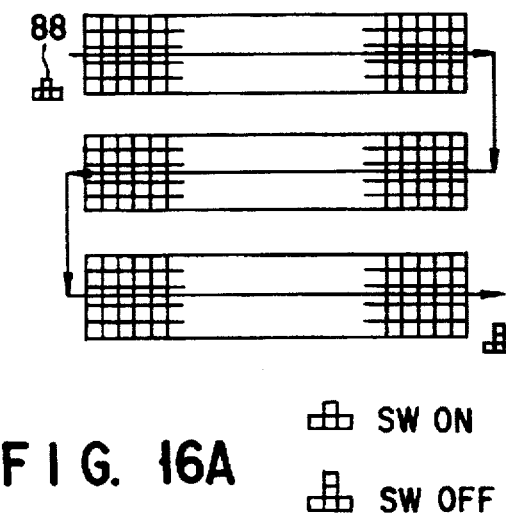
FIGS. 16A to 16F are views showing pattern codes according to the fourth embodiment.
Figure 16B:
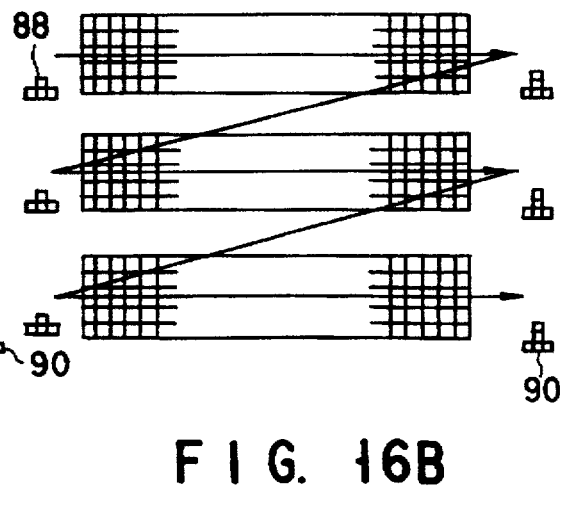

FIGS. 16A and 16B show pattern codes according to the fourth embodiment.

Referring to FIGS. 16A and 16B, a short projection mark 88 indicates the position where an operation switch 22 is turned on, and a tall projection mark 90 indicates the position where the operation switch 22 is turned off.

If the pattern code of one of the subsets described above is recorded over three lines, scanning is started from the short projection mark 88 displayed at the upper left position, made to proceed along the arrows, and terminated at the tall projection mark 90 displayed at the lower right position, as shown in FIG. 16A.

When the other subset described above is divided into certain information units, and the pattern code of each information unit is recorded over three lines, the operation switch 22 is turned on to start a scanning operation at the short projection mark 88 displayed on the left side of the first line, the operation is made to proceed along the arrow, and the operation switch 22 is turned off to terminate the operation at the tall projection mark 90 displayed on the right side of the first line, as shown in FIG. 16B. Thereafter, the next line is scanned in the same manner. Note that the arrows in FIGS. 16A and 16B are written on the drawings to explain the scanning directions but are not actually recorded on the pattern codes.

Figure 16C:
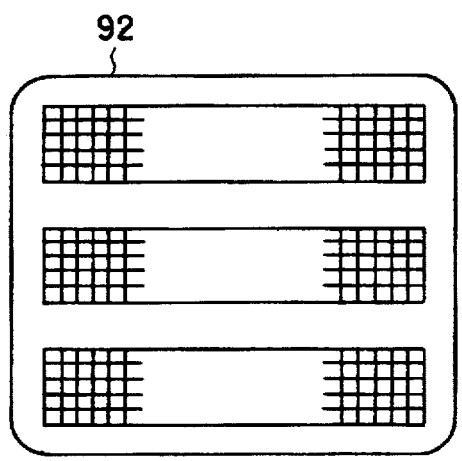
Figure 16D:
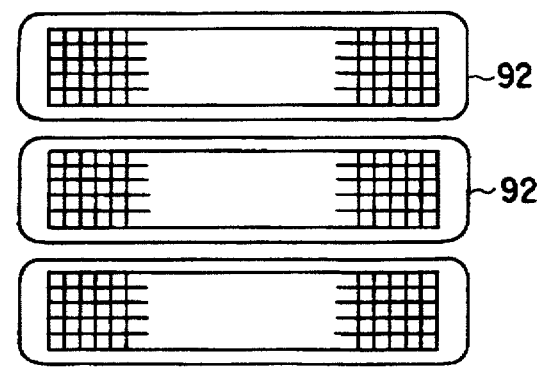

FIGS. 16C and 16D show pattern codes according to a modification of the fourth embodiment. In this modification, a pattern code to be scanned at once is enclosed with a line.

As shown in FIG. 16C, when the pattern code of one of the subsets described above is recorded over three lines, scanning is started from the upper left pattern code portion enclosed with a line 92 and is terminated at the lower right pattern code portion.

As shown in FIG. 16D, when the other subset described above is divided into certain information units, and the pattern code of each information unit is recorded over three lines, scanning is started from the left pattern code portion on the first line and is terminated at the right pattern code portion. Thereafter, the next line is scanned in the same manner.

That is, a pattern code enclosed with the line 92 indicates one unit of scanning.

Figure 16E:
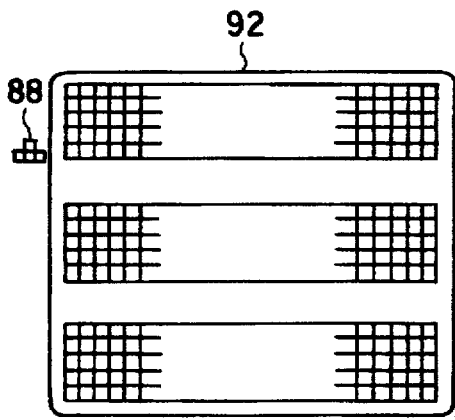
Figure 16F:
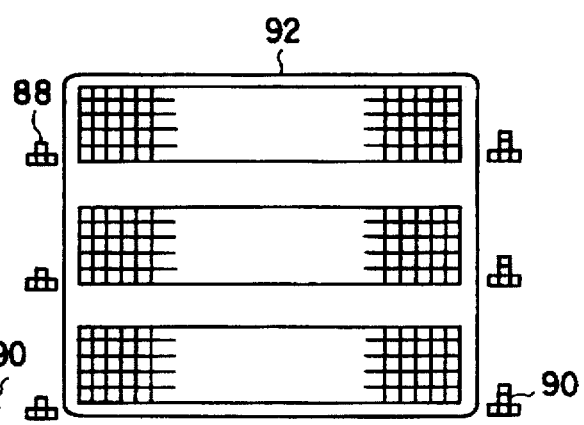

FIGS. 16E and 16F show pattern codes according to another modification of the fourth embodiment. This modification is a combination of the above two embodiments. That is, a projection mark 88 indicates the position where the operation switch 22 is turned on, and a line 92 indicates one unit of scanning.

With this arrangement, the positions where the operation switch 22 are turned on and off and the range to be scanned at once in a scanning operation are clarified to allow an easy operation.

FIGS. 17A and 17B show pattern codes according to still another modification of the fourth embodiment. In this modification, the logo "MMP" indicating the end of scanning is written on a pattern code.

In the case shown in FIG. 17A, scanning is started from the upper left pattern code portion and is terminated at the lower right pattern code portion on which the logo "MMP" is written. In the case shown in FIG. 17B, scanning is started from the left pattern code on the first line and is terminated at the right pattern code portion on which the logo "MMP" is written. Thereafter, the next line is scanned in the same manner.

FIG. 17C shows a pattern code according to still another modification of the fourth embodiment. In this modification, the logos "ON" and "OFF" indicating the positions where the operation switch is turned on and off, i.e., the start and end of scanning, are written on the pattern code.

In the case shown in FIG. 17C, scanning is started from the left pattern code portion on the first line, on which the logo "ON" is written, and is terminated at the right pattern code portion on the second line, on which the logo "OFF" is written. On the third line, scanning is started from the left pattern code portion on the third line, on which the logo "ON" is written, and is terminated at the right pattern code portion on the third line, on which the logo "OFF" is written.

FIG. 17D shows a pattern code according to still another modification of the fourth embodiment. In this modification, arrows are written around the pattern code to indicate the scanning form.

In the case shown in FIG. 17D, scanning is started from the upper left pattern code portion and terminated at the lower right pattern code portion in accordance with the arrows. That is, the pattern code is completely scanned by one scanning operation.

FIG. 18A shows a pattern code according to still another modification of the fourth embodiment. In this modification, the logos "1-1", "1-2", and "1-3" are written on the pattern code to indicate the scanning form.

In the case shown in FIG. 18A, a subset is divided into certain information units, and the pattern code of each information unit is recorded over three lines. In this case, scanning is started from the left pattern code portion on the first line and terminated at the right pattern code portion. Thereafter, the next line is scanned in the same manner.

FIG. 18B shows a pattern code according to still another modification of the fourth embodiment. In this modification, the indicators "1-1", "1-2", and "1-3" are recorded in block codes around the pattern code to indicate the scanning form.

In the case shown in FIG. 18B, similar to the pattern code in FIG. 18A, a subset is divided into certain information units, and the pattern code of each information unit is recorded over three lines. In this case, scanning is started from the left pattern code portion on the first line and terminated at the right pattern code portion. Thereafter, the next line is scanned in the same manner.

FIG. 18C shows a pattern code according to still another modification of the fourth embodiment. In this modification, shapes indicating a scanning form are recorded in block codes at the start and end portions of the pattern code.

In the case shown in FIG. 18C, the pattern code of one subset is recorded over three lines. In this case, scanning is started from the left pattern code portion on the first line. When the first line is completely scanned, scanning is started from the left pattern code portion on the second line. When the second line is completely scanned, scanning is started from the left pattern code portion on the third line and terminated at the right pattern code portion on the third line.

An information recording system of the fifth embodiment designed to form pattern codes according to the second to fourth embodiments will be described next.

Figure 19:
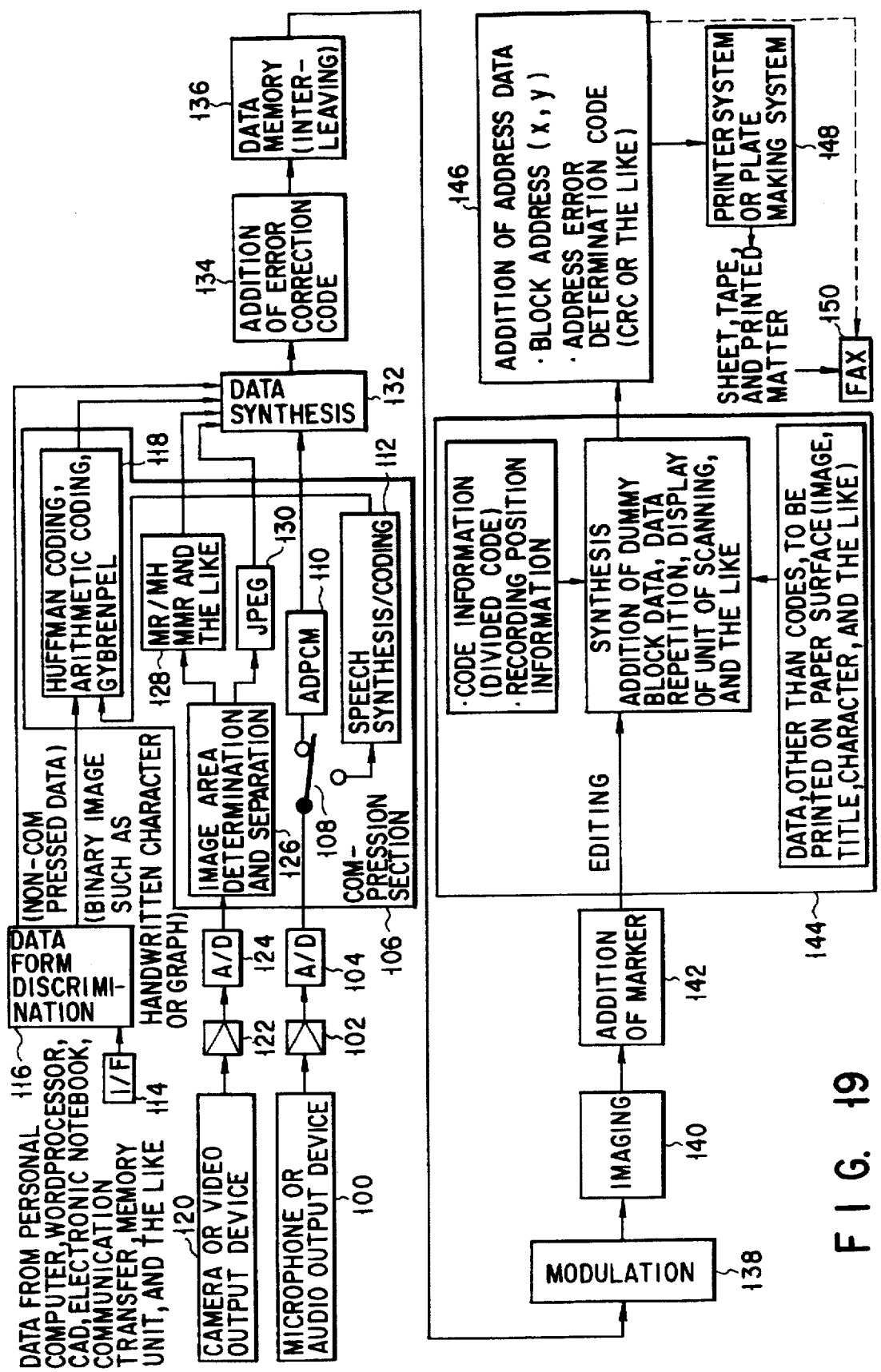
FIG. 19 is a block diagram showing the arrangement of an information recording system according to the fifth embodiment.

FIG. 19 is a block diagram showing the arrangement of the information recording system of the fifth embodiment.

The audio information of multimedia information is input through a microphone or audio output device 100 and amplified by a preamplifier 102. The resultant information is then converted into a digital audio signal by an analog/digital (to be referred to as A/D hereinafter) converter 104. The digital signal is supplied to a compression section 106.

In the compression section 106, the input digital audio signal is selectively supplied to a speech compression circuit 110 such as an ADPCM circuit and a speech synthesis/coding circuit 112 via a switch 108.

The speech compression circuit 110 performs adaptive differential PCM for the input digital audio information to perform data compression. The speech synthesis/coding circuit 112 recognizes one utterance in the input digital audio information and converts the utterance into a code. In this operation, the utterance is converted into a synthetic code temporarily to relatively reduce the data amount, in contrast to the above ADPCM, in which the utterance is coded into speech information to reduce the data amount, i.e., the information is processed as raw information.

The switch 108 is operated, for example, manually operated by the user in accordance with his/her purpose. Alternatively, for example, it may be determined in advance that information with high sound quality such as information from the audio output device is processed by the speech compression circuit 110, and human voices, comments, and the like from the microphone are processed by the speech synthesis/coding circuit 112. In this case, the above switching operation can be automatically performed by recognizing the specific type of input audio information before or after the switch.

Various data formed as digital codes which are sent from, for example, a PC, a wordprocessor, and an electronic notebook, and by communication are input to a data form discrimination circuit 116 via an interface (I/F) 114. The data form discrimination circuit 116 is basically designed to determine whether data can be compressed by the compression section 106 on the subsequent stage. If input data has already undergone some kind of compression processing and no effect can be obtained by the compression section 106 on the subsequent stage, the data form discrimination circuit 116 directly transfers the data to the subsequent stage of the compression section 106 upon bypassing the section 106. If the input data is non-compressed data, the data form discrimination circuit 116 sends the data to the compression section 106.

Data determined as non-compressed code data by the data form discrimination circuit 116 is input to the compression section 106. The code data is then optimally compressed by compression processing in a compression circuit 118 based on Huffman coding, arithmetic coding, gybrenpel coding, or the like. Note that the compression circuit 118 also performs compression processing of an output from the speech synthesis/coding circuit 112.

The speech synthesis/coding circuit 112 may recognize character information as well as speech information and convert it into a speech-synthesis code.

Image information from a camera or video output device 120 is amplified by a preamplifier 122 and A/D-converted by an A/D converter 124. The resultant information is supplied to the compression section 106.

In the compression section 106, an image area determination/separation circuit 126 discriminates whether the input image information represents a binary image such as a written character or a graph or a multivalue image such as a natural image. This image area determination/separation circuit 126 separates binary image data from multivalue image data by using an image area discrimination/separation technique using a neural network like the one disclosed in U.S. Ser. No. 08/562,637 assigned by the present assignee. The binary image data is compressed by JBIG or the like as binary compression in a binary compression circuit 128 based on general MR coding, MH coding, MMR coding, or the like. The multivalue image data is compressed by a multivalue compression circuit 130 using a still image compressing function such as DPCM or JPEG.

The data having undergone compression processing in the above manner are properly synthesized by a data synthesis section 132.

All the information input and compression processing systems need not be arranged in parallel. One system or a combination of a plurality of systems may be arranged in accordance with a purpose. Therefore, the data synthesis section 132 need not always be used. If there is only one type of data system, the data synthesis section 132 can be omitted to allow data to be directly input to an error correction code addition section 134 on the subsequent stage.

The error correction code addition section 134 adds error correction codes to the input data. The resultant data are input to a data memory section 136. The data are stored in the data memory section 136. Thereafter, interleaving processing is performed. In this processing, continuous data strings are dispersed at proper distances to reduce errors and improve the correction performance when the data are actually recorded as pattern codes, and the codes are reproduced. That is, interleaving is performed to decrease the critical probability of burst errors to that of bit errors. The data having undergone interleaving processing in this manner are input to a modulation circuit 138. The modulation circuit 138 performs 8–10 modulation or the like.

In the above embodiment, as is apparent, error correction codes may be added to data upon execution of interleaving.

Subsequently, the data are input to a marker addition section 142 via an imaging section 140. The marker addition section 142 generates markers using data strings other than 256 data strings related by the modulation circuit 138, and adds the markers to the data. Since the markers are added after modulation, they are not modulated. This prevents the markers from being difficult to recognize.

The data to which the markers are added in this manner are sent to an editing section 144. The editing section 144 performs editing processing of the data created in the above manner, e.g., adding dummy block data to the data, duplicating the data, and displaying the data for each scanning cycle. In addition, the editing section 144 performs editing processing of code information as division information, recording position information, and the like. Furthermore, the data are synthesized with data to be recorded on a recording paper sheet, e.g., image data, title data, character data, and the like, and are converted according to a data format corresponding to a printer output form or plate making. The resultant data are sent to an address data addition section 146. The address data addition section 146 adds block addresses and address error discrimination codes (e.g., CRC) to the data. The resultant data are sent to a printer system or plate making system 148. The data to which the address data are added are printed on a sheet, a tape, printed matter, or the like by the printer system or plate making system 148.

The editing processing in the editing section 144 includes layout of paper surface information and pattern codes, matching the dot size of codes with the resolution of a printer or the like, line feed by properly delimiting the code length in units of words or in accordance with contents, i.e., line feed to the next line, and the like.

For example, the data of the printed matter obtained in this manner is transmitted by a FAX 150. As is apparent, the data which are created by the editing section 144 and to which the address data are added may be directly transmitted by the FAX 150 instead of being printed.

In this information recording system, the editing section 144 performs editing processing of code information as division information, recording position information, and the like, and determines the positions of pattern codes. Thereafter, the address data addition section 146 adds block address data to the data on the basis of the above code information and the recording position information. Therefore, different address data can be added to adjacent pattern codes without any overlap or repetition.

Figure 20:
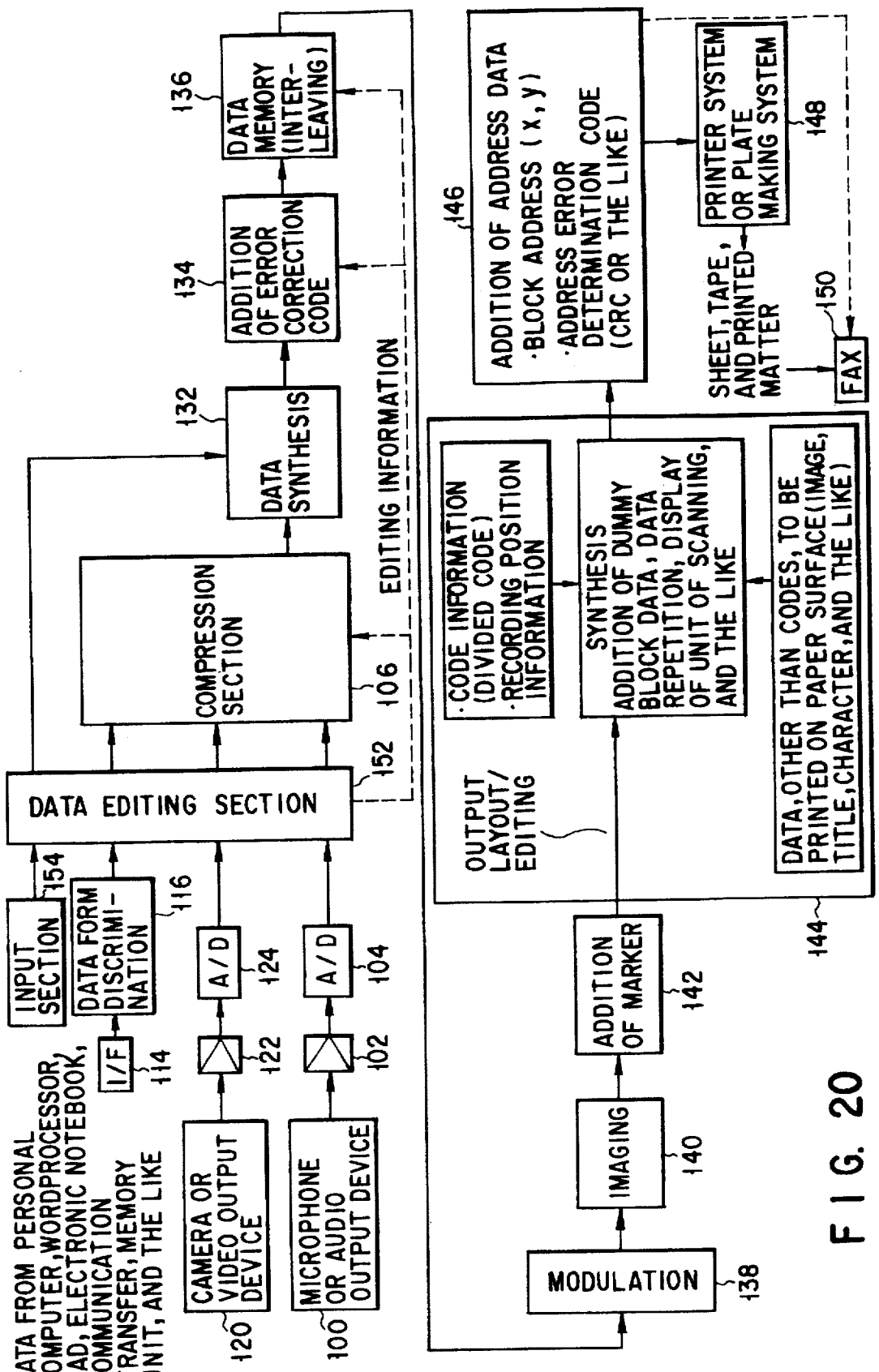
FIG. 20 is a block diagram showing the arrangement of an information recording system according to a modification of the fifth embodiment.

FIG. 20 is a block diagram showing the arrangement of an information recording system according to a modification of the fifth embodiment.

According to the arrangement of this information recording system, a data editing section 152 is added to the input stage of the compression section 106 in the embodiment shown in FIG. 19, and an input section 154 is added to the input stage of the data editing section 152. Since the other arrangements are the same, a description thereof will be omitted.

In this information recording system, an information unit (data length) as a minimum output unit (in reproduction processing) of multimedia information input from a PC, a camera, a microphone, or the like is determined by the data editing section 152. The input multimedia information is divided in information units as the above minimum output units in reproduction processing. The resultant data are then sent to the compression section 106.

The data input to the compression section 106 are compressed for each information on the basis of editing information as size data of each information unit described above. The error correction code addition section 134 adds error correction codes to the data. The data are then subjected to interleaving in the data memory section 136.

Subsequently, the data are processed in the same manner as in the embodiment shown in FIG. 19. The data are converted into pattern codes for each information. The pattern codes are then printed on a sheet, a tape, printed matter, or the like.

For example, in processing speech information, the minimum output unit in reproduction processing is a unit such as a word, a phrase, or a sentence, i.e., a unit having a meaning or the like which can be recognized in reproduction processing.

Assume that in this information recording system, a continuously pronounced utterance like "This is a pen" is recorded as pattern codes respectively obtained by dividing the utterance into the words "This", "is", "a", and "pen".

The above utterance is input to the microphone 100. The utterance is then input to the data editing section 152 via the preamplifier 102 and the A/D converter 104. The data editing section 152 visualizes the waveform of the utterance continuously pronounced as "This is a pen", and recognizes the silent portions between the waveforms corresponding to the respective words "This", "is", "a", and "pen". The data editing section 152 then divides the respective words and sends them to the compression section 106.

The compression section 106 performs optimal compression processing such as ADPCM for the respective information units divided in units of words. The error correction code addition section 134 adds error correction codes to the resultant data. The data are then interleaved in the data memory section 136.

Subsequently, the data are processed in the same manner as in the embodiment shown in FIG. 19. The resultant data are converted into pattern codes in units of words, i.e., "This", "is", "a", and "pen". The codes are then recorded.

In this case, no repetitive block address data are set in the pattern codes generated in units of words.

In the information reproduction system shown in FIG. 1, since the pattern codes have no repetitive block addresses, the above information units visually divided in accordance with the operator's intention, i.e., the pattern codes representing the words, can be selected and operated. The system can therefore reproduce the continuous utterance "This is a pen", each word, e.g., only the utterance "This", a continuous utterance portion "This is", and the like.

In processing moving pictures, moving picture compression may be performed after an information unit as a minimum output unit in reproduction processing is divided in units of scenes, and error correction codes may be added to the resultant data. The data are then interleaved. The subsequent processing is performed to create pattern codes.

The above editing information can be input through the input section 154. In addition, automatic determination may be performed in the data editing section 152.

The present invention has been described above in conjunction with the embodiments. However, the present invention is not limited to the embodiments described above. Various changes and modifications can be made within the spirit and scope of the invention. The gist of the present invention will be summarized below.

(1) There is provided an information reproduction system including reading means for optically reading a code from a recording medium having a portion on which multimedia information including at least one of audio information, video information, and digital code data is recorded as an optically readable code, and a plurality of processing means for sequentially processing the code read by the reading means and outputting the processed code as the original multimedia information, comprising:

an operation switch for designating a start of reading of the code; and control means causing one or a plurality of the plurality of processing means to terminate a processing operation for a code which has been read by the time the operation switch is operated, and executing processing for data of the processed code in correspondence with another processing means on a subsequent stage, on the basis of an operation of the operation switch after the start of reading is designated by the operation switch.

That is, since the starts and ends of a plurality of processing operations can be designated by one operation switch, the operator can easily operate the system.

(2) In the information reproduction system according to arrangement (1), the plurality of processing means comprise:

restoration means for demodulating the code read by the reading means and outputting the demodulated data; and reproduction means for performing processing associated with error correction for the demodulated data output from the restoration means, and the control means causes the restoration means to terminate processing for a code which has been read by the time the operation switch is operated, and causes the reproduction means to reproduce data of the processed code, on the basis of an operation of the operation switch after the start of reading is designated by the operation switch.

That is, since the starts and ends of operations of the reading means and the restoration means can be designated by one operation switch, the operator can easily operate the system. In addition, the starts and ends of at least operations of the reading means and the restoration means, which are performed while the operator scans a code with the reading section, can be controlled by one switch.

Reproduction processing including interleaving processing, error correction processing, and the like for demodulated data demodulated from a plurality of read code data is started after a scanning operation. For this reason, all demodulated data are prepared before reproduction processing, and hence the reproduction processing can be efficiently executed. Furthermore, since the reading means and the reproduction means are not operated at the same time, the above read data is not input while the reproduction means is operating. For this reason, a circuit and programs as the control means can be simplified.

(3) In the information reproduction system according to arrangement (1), the plurality of processing means comprise:

restoration means for demodulating the code read by the reading means and outputting the demodulated data;

reproduction means for performing processing associated with error correction for the demodulated data output from the restoration means; and output means for outputting the data, output from the reproduction means, as the original multimedia information to be recognizable, and the control means causes the restoration means to terminate a processing operation for a code which has been read by the time the operation switch is operated, causes the reproduction means to reproduce data of the processed code, and causes the output means to process the data from the reproduction means and output the data as the multimedia information, on the basis of an operation of the operation switch after the start of reading is designated by the operation switch.

That is, since the starts and ends of operations of the reading means and the restoration means can be designated by one operation switch, the operator can easily operate the system. In addition, the starts and ends of at least operations of the reading means and the restoration means, which are performed while the operator scans a code with the reading section, can be controlled by one switch.

Reproduction processing including interleaving processing, error correction processing, and the like for demodulated data demodulated from a plurality of read code data is started after a scanning operation. For this reason, all demodulated data are prepared before reproduction processing, and hence the reproduction processing can be efficiently executed. Furthermore, since the reading means and the reproduction means are not operated at the same time, the above read data is not input while the reproduction means is operating. For this reason, a circuit and programs as the control means can be simplified.

(4) In the information reproduction system according to arrangement (1), the plurality of processing means comprise:

restoration means for demodulating the code read by the reading means and outputting the demodulated data;

reproduction means for performing processing associated with error correction for the demodulated data output from the restoration means; and output means for outputting the data, output from the reproduction means, as the original multimedia information to be recognizable, and the control means causes the restoration means and the reproduction means to terminate processing operations for a code which has been read by the time the operation switch is operated, and causes the output means to process the data from the reproduction means and output the data as the multimedia information, on the basis of an operation of the operation switch after the start of reading is designated by the operation switch.

That is, since the starts and ends of operations of the reading means and the restoration means can be designated by one operation switch, and the start of operation of the output means can also be designated, the operator can easily operate the system. In addition, since reproduction processing is performed during a scanning operation of the reading means, the time required to output multimedia information from the time an output operation is designated can be shortened.

(5) In the information reproduction system according to any one of arrangements (1) to (4), the operation switch is a self-reset switch which is arranged on a housing having at least the reading means and can be set in an ON state only in a depressed state, and the code is read while the operation switch is depressed, and a releasing operation for the operation switch corresponds to the operation of the operation switch after the start of reading is designated by the operation switch.

That is, the operator performs a scanning operation only while he/she is depressing the operation switch, and designates the start of output processing of multimedia information by releasing the operation switch. In addition, the control means of the information reproduction system performs a reading operation only while the operation switch is depressed, and starts output processing when the operation switch is released. Since a switch operation exhibits one-to-one correspondence with processing, and information can be reproduced by only depressing and releasing one operation switch once, the operator can easily operate the system.

(6) In the information reproduction system according to any one of arrangements (1) to (4), the operation switch is a self-reset switch which is arranged on a housing having at least the reading means and can be set in an ON state only in a depressed state, and the code is read by a clicking operation including instantaneous depressing and releasing operations, and a re-clicking operation corresponds to the operation of the operation switch after the start of reading is designated by the operation switch.

That is, the operator performs the above clicking operation to perform a scanning operation, and designates the start of output processing of multimedia information by performing the above re-clicking operation. In addition, the control means of the information reproduction system performs a reading operation upon the above clicking operation, and starts output processing upon the above re-clicking operation. Since a scanning operation of the reading means as one operation and other operations such as depression of the switch are not performed at once, the operator can concentrate on the scanning operation. For this reason, a shake of the reading means in a scanning operation can be reduced, and the operator can easily perform an operation.

(7) In the information reproduction system according to any one of arrangements (1) to (4), the operation switch is a self-reset switch which is arranged on a housing having at least the reading means and can be set in an ON state by a clicking operation including instantaneous depressing and releasing operations, and the code is read by performing the clicking operation once or a plurality of number of times, and a clicking operation performed the number of times different from the number of times of clicking operations performed before corresponds to the operation of the operation switch after the start of reading is designated by the operation switch.

That is, the operator performs the above clicking operation to perform a scanning operation, and designates the start of output processing of multimedia information by performing the above re-clicking operation. In addition, the control means of the information reproduction system performs a reading operation upon the above clicking operation, and starts output processing upon the above re-clicking operation. Since a scanning operation of the reading means as one operation and other operations such as depression of the switch are not performed at once, the operator can concentrate on the scanning operation. For this reason, a shake of the reading means in a scanning operation can be reduced, and the operator can easily perform an operation.

(8) There is provided an information reproduction system including reading means for optically reading a code from a recording medium having a portion on which multimedia information including at least one of audio information, video information, and digital code data is recorded as an optically readable code, and a plurality of processing means for sequentially processing the code read by the reading means and outputting the processed code as the original multimedia information, comprising:

a first operation switch for designating a start of reading of the code;

a second operation switch for designating an end of reading of the code; and control means causing one or a plurality of the plurality of processing means to terminate a processing operation for a code which has been read by the time the second operation switch is operated, and executing processing for data of the processed code in correspondence with another processing means on a subsequent stage, on the basis of an operation of the second operation switch.

That is, the operation switches for controlling the start and end of the processing means as the information reproduction system are independently prepared for operations performed by the operator. Since one operation corresponds to one switch, the operator can easily operate the system.

(9) In the information reproduction system according to arrangement (8), the plurality of processing means comprise:

restoration means for demodulating the code read by the reading means and outputting the demodulated data; and reproduction means for performing processing associated with error correction for the demodulated data output from the restoration means, and the control means causes the restoration means to terminate processing for a code which has been read by the time the second operation switch is operated, and causes the reproduction means to reproduce data of the processed code, on the basis of an operation of the second operation switch.

That is, the operation switches for controlling the start and end of the processing means as the information reproduction system are independently prepared for designation of a scanning operation of the reading means, storage of reproduction data in the memory unit, and the like as operations performed by the operator. Since one operation corresponds to one switch, the operator can easily operate the system.

In addition, since the reading means and the reproduction means are not operated at once, the read data is not input during an operation of the reproduction means. For this reason, a circuit and programs as the control means can be simplified.

(10) In the information reproduction system according to arrangement (8), the plurality of processing means comprise:

restoration means for demodulating the code read by the reading means and outputting the demodulated data;

reproduction means for performing processing associated with error correction for the demodulated data output from the restoration means; and output means for outputting the data, output from the reproduction means, as the original multimedia information to be recognizable, and the control means causes the restoration means to terminate a processing operation for a code which has been read by the time the second operation switch is operated, causes the reproduction means to reproduce data of the processed code, and causes the output means to process the data from the reproduction means and output the data as the multimedia information, on the basis of an operation of the second operation switch.

That is, the operation switches for controlling the start and end of the processing means as the information reproduction system are independently prepared for designation of a scanning operation of the reading means, output processing of multimedia information, and the like as operations performed by the operator. Since one operation corresponds to one switch, the operator can easily operate the system. Since a scanning operation of the reading means as one operation and other operations such as depression of the switch are not performed at once, the operator can concentrate on the scanning operation. For this reason, a shake of the reading means in a scanning operation can be reduced, and the operator can easily perform an operation.

In addition, since the reading means and the reproduction means are not operated at once, the read data is not input during an operation of the reproduction means. For this reason, a circuit and programs as the control means can be simplified.

(11) In the information reproduction system according to arrangement (8), the plurality of processing means comprise:

restoration means for demodulating the code read by the reading means and outputting the demodulated data;

reproduction means for performing processing associated with error correction for the demodulated data output from the restoration means; and output means for outputting the data, output from the reproduction means, as the original multimedia information to be recognizable, and the control means causes the restoration means and the reproduction means to terminate processing operations for a code which has been read by the time the second operation switch is operated, and causes the output means to process the data from the reproduction means and output the data as the multimedia information, on the basis of an operation of the second operation switch.

That is, the operation switches for controlling the start and end of the processing means as the information reproduction system are independently prepared for designation of a scanning operation of the reading means, output processing of multimedia information, and the like as operations performed by the operator. Since reproduction processing is performed during a scanning operation of the reading means, the time required to output multimedia information from the time an output operation is designated can be shortened. In addition, since one operation corresponds to one switch, the operator can easily operate the system. Since a scanning operation of the reading means as one operation and other operations such as depression of the switch are not performed at once, the operator can concentrate on the scanning operation. For this reason, a shake of the reading means in a scanning operation can be reduced, and the operator can easily perform an operation.

(12) In the information reproduction system according to any one of arrangements (8) to (11), the first operation switch is a power switch of the information reproduction system, and the second operation switch is an operation switch arranged on a housing having at least the reading means.

That is, the operation switches for controlling the start and end of the processing means as the information reproduction system are independently prepared for designation of a scanning operation of the reading means, output processing of multimedia information, and the like as operations performed by the operator. Since reproduction processing is performed during a scanning operation of the reading means, the time required to output multimedia information from the time an output operation is designated can be shortened. In addition, since one operation corresponds to one switch, the operator can easily operate the system.

The first operation switch is the power switch. When the first operation switch is in an OFF state, power saving is performed. When this switch is operated, a reading operation is performed. The operator therefore can scan a code at any time. The second operation switch need only be operated when read data is to be output. This makes it easy to perform an operation. In addition, since the number of times of switching operations for a code scanning operation is small, the operator can easily performs operations. Since a scanning operation of the reading means as one operation and other operations such as depression of the switch are not performed at once, the operator can concentrate on the scanning operation. For this reason, a shake of the reading means in a scanning operation can be reduced, and the operator can easily perform an operation.

In addition, since the reading means and the reproduction means are not operated at once, the read data is not input during an operation of the reproduction means. For this reason, a circuit and programs as the control means can be simplified.

(13) There is provided an information reproduction system including reading means for optically reading a code from a recording medium having a portion on which multimedia information including at least one of audio information, video information, and digital code data is recorded as an optically readable code, and a plurality of processing means for sequentially processing the code read by the reading means and outputting the processed code as the original multimedia information, comprising:

a first operation switch for designating a start of reading of the code;

a second operation switch for designating an end of reading of the code; and control means for outputting data of a code, which has been read by the time the second operation switch is operated and is processed by one or a plurality of the plurality of processing means, as the original multimedia information, on the basis of an operation of the second operation switch.

That is, the operation switches for controlling the start and end of the processing means as the information reproduction system are independently prepared for designation of a scanning operation of the reading means, output processing of multimedia information, and the like as operations performed by the operator. Since reproduction processing is performed during a scanning operation of the reading means, the time required to output multimedia information from the time an output operation is designated can be shortened. In addition, since one operation corresponds to one switch, the operator can easily operate the system.

The first operation switch is the power switch. When the first operation switch is in an OFF state, power saving is performed. After this switch is operated, a reading operation can always be performed. The operator therefore can scan a code at any time. The second operation switch need only be operated when read data is to be output. This makes it easy to perform an operation. In addition, since the number of times of switching operations for a code scanning operation is small, the operator can easily performs operations.

(14) In the information reproduction system according to arrangement (13), an operation of the first operation switch corresponds to an operation for allowing power to be supplied to the information reproduction system.

That is, when the operation of the reading means, which includes connection of the power supply or battery, is started by operating the first operation switch, power can be supplied to the information reproduction system. No special mechanical switch or the like is therefore required, and hence a simple arrangement can be realized.

In addition, the operation switches for controlling the start and end of the processing means as the information reproduction system are independently prepared for designation of a scanning operation of the reading means, output processing of multimedia information, and the like as operations performed by the operator. Since reproduction processing is performed during a scanning operation of the reading means, the time required to output multimedia information from the time an output operation is designated can be shortened. In addition, since one operation corresponds to one switch, the operator can easily operate the system.

The first operation switch is the power switch. When the first operation switch is in an OFF state, power saving is performed. After this switch is operated, a reading operation can always be performed. The operator therefore can scan a code at any time. The second operation switch need only be operated when read data is to be output. This makes it easy to perform an operation. In addition, since the number of times of switching operations for a code scanning operation is small, the operator can easily performs operations.

(15) There is provided an information reproduction system including reading means for optically reading a code from a recording medium having a portion on which multimedia information including at least one of audio information, video information, and digital code data is recorded as an optically readable code, and a plurality of processing means for sequentially processing the code read by the reading means and outputting the processed code as the original multimedia information, comprising:

a sub-switch which is arranged on a reading surface of a housing including at least the reading means to form an ON/OFF state in accordance with contact with a recording medium to designate a start of reading of the code;

a main switch for permitting/inhibiting an operation of the sub-switch;

control means causing one or a plurality of the plurality of processing means to terminate a processing operation for a code which has been read by the time the sub-switch is operated, and executing processing for data of the processed code in correspondence with another processing means on a subsequent stage, on the basis of an operation of the sub-switch after the start of reading; and output control means for outputting the data processed by the another processing means as the multimedia information on the basis of an operation of the main switch.

That is, in reading a code, the operator performs a scanning operation to read the code by performing two operations, i.e., operating the main switch for designating the intention of reading the code with respect to the information reproduction system, and locating the reading means on a recording medium to read the code. Since no reading processing is performed in the interval between the instant at which the main switch is operated and the instant at which the reading means is located on the recording medium, power saving can be performed.

The reading processing is terminated either when the reading means is separated from a paper surface, which indicates the operator's intention of terminating the code scanning operation, or when the main switch is operated. This makes it possible to shorten the processing time of the plurality of processing means. Power saving can therefore be performed. That is, efficient power saving can be realized by the two switches.

In addition, when the sub-switch is turned off, another processing means on the subsequent stage is started. With this operation, the time required to output multimedia information after the main switch is turned off can be shortened.

(16) There is provided an information reproduction system including reading means for optically reading a code from a recording medium having a portion on which multimedia information including at least one of audio information, video information, and digital code data is recorded as an optically readable code, restoration means for demodulating the code read by the reading means and outputting the demodulated data, reproduction means for performing processing associated with error correction for the demodulated data output from the restoration means, and output means for outputting the data, output from the reproduction means, as the original multimedia information to be recognizable, comprising:

an operation switch for designating a start of reading of the code;

determination means for determining whether a code to be applied to the information reproduction system is read by the reading means in a predetermined period of time after an operation of the operation switch; and notification means for notifying a state in accordance with the determination result obtained by the determination means.

That is, if a code cannot be read within a predetermined period of time after the operator operates the operation switch to designate the start of a reading operation, the operator or the like is notified that the code scanned by the operator is not a readable code or is non-code data such as character, which cannot be read by the information reproduction system. This makes it possible to notify/instruct the operator to scan a code to be applied to the system.

(17) There is provided an information reproduction system including reading means for optically reading a code from a recording medium having a portion on which multimedia information including at least one of audio information, video information, and digital code data is recorded as an optically readable code, restoration means for demodulating the code read by the reading means and outputting the demodulated data, reproduction means for performing processing associated with error correction for the demodulated data output from the restoration means, and output means for outputting the data, output from the reproduction means, as the original multimedia information to be recognizable, comprising:

an operation switch for designating a start of reading of the code;

determination means for determining whether a code to be applied to the information reproduction system is read by the reading means in a predetermined period of time after an operation of the operation switch; and power supply control means for supplying power to only a predetermined circuit portion in the information reproduction system when the determination means determines that the code is not read.

That is, if a code is not read within a predetermined period of time after the operator operates the operation switch to designate the start of a reading operation, it is determined that the operator has no intention of scanning a code, and power saving can be performed by the power control means.

In addition, if the operation switch is unintentionally operated when, for example, the reading means falls, the power control means performs power saving to prevent consumption of unnecessary power.

(18) There is provided an information reproduction system including

> reading means for optically reading a code from a recording medium having a portion on which multimedia information including at least one of audio information, video information, and digital code data is recorded as an optically readable code,
>
> restoration means for demodulating the code read by the reading means and outputting the demodulated data, and
>
> reproduction means for performing processing associated with error correction for the demodulated data output from the restoration means, comprising:
>> an operation switch for designating a start of reading of the code;
>>
>> determination means for determining whether a code to be applied to the information reproduction system is read by the reading means in a predetermined period of time after an operation of the operation switch; and
>>
>> control means for causing the restoration means to terminate a processing operation when the determination means determines that the code is not read.

That is, if a code is not read within a predetermined period of time after the operator operates the operation switch to designate the start of a reading operation, it is determined that the operator has no intention of scanning a code, and the control means terminates the operation of the restoration means which requires large power for high-speed processing, thereby realizing power saving.

In addition, even if the operation switch is unintentionally operated when, for example, the reading means falls, the power control means performs power saving to prevent consumption of unnecessary power.

(19) There is provided an information reproduction system including

> reading means for optically reading a code from a recording medium having a portion on which multimedia information including at least one of audio information, video information, and digital code data is recorded as an optically readable code,
>
> restoration means for demodulating the code read by the reading means and outputting the demodulated data, and
>
> reproduction means for performing processing associated with error correction for the demodulated data output from the restoration means, comprising:
>> determination means for determining whether a code to be applied to the information reproduction system is detected in a predetermined period of time after the code is detected by the restoration means; and
>>
>> notification means for, when the determination means determines that the code is not detected, notifying that the code is not detected.

That is, if a code to be applied to the system is not read within a predetermined period of time after a code to be applied to the system is read once by a reading operation performed by the operator, the operator is notified, while a reading operation is designated, that the operator's intention of reading a code is lost or the operator is trying to read a code other than a code to be applied to the system. This makes it possible to notify/instruct the operator to scan a code to be applied to the system.

(20) There is provided an information reproduction system including

> reading means for optically reading a code from a recording medium having a portion on which multimedia information including at least one of audio information, video information, and digital code data is recorded as an optically readable code,
>
> restoration means for demodulating the code read by the reading means and outputting the demodulated data, and
>
> reproduction means for performing processing associated with error correction for the demodulated data output from the restoration means, comprising:
>> determination means for determining whether all codes read by the reading means and processed by the restoration means are codes to be applied to the information reproduction system; and
>>
>> notification means for, when the determination means determines that all the codes read by the reading means are not codes to be applied to the information reproduction system, notifying that all the codes are not codes to be applied to the information reproduction system.

That is, if no code to be applied to the system is read by a reading operation performed by the operator, it can be notified that the scanned code is not a code to be applied to the system. If the scanned code is a code to be applied to the system, an abnormality in the information reproduction system can be notified.

(21) There is provided an information reproduction system including

> reading means for optically reading a code from a recording medium having a portion on which multimedia information including at least one of audio information, video information, and digital code data is recorded as an optically readable code,
>
> restoration means for demodulating the code read by the reading means and outputting the demodulated data, and
>
> reproduction means for performing processing associated with error correction for the demodulated data output from the restoration means, comprising
>> notification means for, when it is determined that a code processed by the restoration means is a code to be applied to the information reproduction system and cannot be reproduced by the reproduction means, notifying that the code is to be applied to the information reproduction system and cannot be reproduced by the reproduction means.

That is, it can be notified that a code read by a reading operation performed by the operator is a code which cannot be reproduced, or a scanning error has occurred. A code which cannot be reproduced includes a code whose header structure or data cannot be applied to the information reproduction system, a code in a bad printed state, and the like. The operator can be notified of such a code. A scanning error includes an error caused when the reading means deviates from a proper code scanning position due to a shake of the means, an error caused when scanning is performed under operation conditions which are not permitted in the information reproduction system, and the like.

(22) There is provided an information reproduction system including reading means for optically reading a code from a recording medium having a portion on which multimedia information including at least one of audio information, video information, and digital code data is recorded as an optically readable code, restoration means for demodulating the code read by the reading means and outputting the demodulated data, reproduction means for performing processing associated with error correction for the demodulated data output from the restoration means, and output means for outputting the data, output from the reproduction means, as the original multimedia information to be recognizable, comprising notification means for, when reproduction can be performed by the reproduction means and data associated with a previous code reading operation is left in an output buffer in the output means, notifying that reproduction can be performed by the reproduction means and the data associated with the previous code reading operation is left in the output buffer.

That is, if the reproduction data obtained by the previous code scanning operation is left in the output buffer, both the previous data and the currently read data can be retained. In addition, the operator can be notified in advance that data retained upon a previous code scanning operation is deleted when the next code scanning operation is performed, or the next code scanning operation becomes invalid.

(23) There is provided an information reproduction system including reading means for optically reading a code from a recording medium having a portion on which multimedia information including at least one of audio information, video information, and digital code data is recorded as an optically readable code, restoration means for demodulating the code read by the reading means and outputting the demodulated data, reproduction means for performing processing associated with error correction for the demodulated data output from the restoration means, and output means for outputting the data, output from the reproduction means, as the original multimedia information to be recognizable, comprising notification control means for notifying an error state upon changing a notification output form in accordance with each error type in order to notify each of error states associated with a code reading operation of the reading means and an operation of outputting the multimedia information from the output means.

That is, the operator can be notified of each error type, e.g., a system abnormality, a code scanning error, and scanning of a code which cannot be applied to the information reproduction system, when reproduction cannot be performed. This allows the operator to identify the error and indicates measures to properly perform the next scanning operation.

(24) There is provided an information reproduction system including reading means for optically reading a code from a recording medium having a portion on which multimedia information including at least one of audio information, video information, and digital code data is recorded as an optically readable code, restoration means for demodulating the code read by the reading means and outputting the demodulated data, reproduction means for performing processing associated with error correction for the demodulated data output from the restoration means, and output means for outputting the data, output from the reproduction means, as the original multimedia information to be recognizable, wherein the restoration means includes a data memory for storing demodulated data, and the reproduction means includes an output buffer memory for temporarily storing data having undergone error correction when the data is to be output to the output means.

That is, since the system has the two memories, i.e., the data memory and the output buffer memory, the second reading operation can be performed before data obtained by the first code reading operation is subjected to output processing and output. The second data can therefore be output upon completion of outputting of the first code.

(25) In the information reproduction system according to arrangement (24), the data memory and the output buffer memory are constituted by the same memory module.

That is, since the system has the two memories, i.e., the data memory and the output buffer memory, the second reading operation can be performed before data obtained by the first code reading operation is subjected to output processing and output. The second data can therefore be output upon completion of outputting of the first code.

In addition, the number of memory modules constituting the system can be reduced, and hence a compact, inexpensive system can be formed.

(26) There is provided an information reproduction system including reading means for optically reading a code from a recording medium having a portion on which multimedia information including at least one of audio information, video information, and digital code data is recorded as an optically readable code, restoration means for demodulating the code read by the reading means and outputting the demodulated data, reproduction means for performing processing associated with error correction for the demodulated data output from the restoration means, and output means for outputting the data, output from the reproduction means, as the original multimedia information to be recognizable, wherein the code is constituted by a linked structure obtained by two-dimensionally arranging blocks each having data associated with the multimedia information and unique address data thereof, and the restoration means has a data memory in which address spaces are set in on-to-one correspondence with addresses of the blocks to store data associated with the multimedia information in units of blocks.

That is, recorded multimedia information can be reproduced even if blocks are read independently of the order of block addresses in scanning and reading a code. For this reason, the code scanning direction and method are not limited to allow arbitrary operations. In addition, the addresses of the blocks constituting a code need not be aligned.

(27) In the information reproduction system according to arrangement (26), the data memory has a block management table area for storing storage/non-storage information in units of blocks, the information indicating whether data associated with multimedia information is stored at the address of a corresponding one of the blocks.

That is, since input block data can be managed, and only the input block data can be variously processed, unnecessary processing can be reduced, and a high-speed system can be formed. The time taken to output multimedia information can therefore be shortened, and operability can be improved.

In addition, since block data need not be processed in the input order but can be processed in the order of increasing (decreasing) address values, recorded information can be easily processed and reproduced. Furthermore, recorded multimedia information can be reproduced even if blocks are read independently of the order of block addresses in scanning and reading a code. For this reason, the code scanning direction and method are not limited to allow arbitrary operations. In addition, the addresses of the blocks constituting a code need not be aligned.

(28) There is provided an information reproduction system including

> reading means for optically reading a code from a recording medium having a portion on which multimedia information including at least one of audio information, video information, and digital code data is recorded as an optically readable code,
>
> restoration means for demodulating the code read by the reading means and outputting the demodulated data,
>
> reproduction means for performing processing associated with error correction for the demodulated data output from the restoration means, and
>
> output means for outputting the data, output from the reproduction means, as the original multimedia information to be recognizable,
>
> wherein when one of the codes is arranged as a plurality of spatially divided codes on a recording medium because the code is constituted by data in an amount determined by a capacity of a data memory for storing the demodulated data, each of the divided codes includes division information indicating that the divided code is a portion of the plurality of divided codes constituting one of the codes, and
>
> the output means recognizes an aggregated state of all the divided codes associated with one of the codes by detecting the division information, and outputs the multimedia information corresponding to one of the codes on the basis of the recognition result.

That is, one code is spatially divided into divided codes, and each divided code is made to have division information. With this arrangement, by reproducing the code constituted by the divided codes each including division information, multimedia information corresponding to the code can be reproduced and output. This makes it possible to reproduce and output multimedia information larger in amount than the capacity of the data memory.

(29) There is provided a recording medium having a portion on which multimedia information including at least one of audio information, video information, and digital code data is recorded as optically readable codes, > wherein an information reproduction system, which is adapted to read the codes and to which the codes are to be applied, has a data memory for storing demodulated data obtained by demodulating the codes, and
>
> a data amount of one of the codes is determined on the basis of a capacity of the data memory.

That is, the recorded multimedia information can be reliably reproduced by reading the code. For example, by scanning a code obtained by recording speech information as multimedia information, the recorded speech information can be faithfully reproduced without being interrupted.

(30) There is provided a recording medium having a portion on which multimedia information including at least one of audio information, video information, and digital code data is recorded as optically readable codes, > wherein an information reproduction system, which is adapted to read the codes and to which the codes are to be applied, has a data memory for storing demodulated data obtained by demodulating the codes, and
>
> when one of the codes is arranged as a plurality of spatially divided codes on a recording medium because one of the codes is constituted by data in an amount determined by a capacity of the data memory for storing the demodulated data, each of the divided codes includes division information indicating that one of the divided codes is a portion of the plurality of divided codes constituting one of the codes.

That is, information larger in amount than the capacity of the data memory of the information reproduction system is divided and recorded on the recording medium with division information being added thereto, and the information reproduction system can reproduce the information from the recording medium. The information reproduction system can reproduce multimedia information such as long-time speech information or high-quality, large-volume image information.

(31) There is provided a recording medium having a portion on which multimedia information including at least one of audio information, video information, and digital code data is recorded as optically readable codes, > wherein each of the codes is constituted by a linked structure obtained by two-dimensionally arranging blocks each having data associated with the multimedia information and unique address data thereof, and
>
> one of the codes and another of the codes which are arranged on the recording medium to be adjacent to each other have different block address data.

That is, even if a code adjacent to a desired code is erroneously scanned, necessary information is not interfered. For this reason, the tolerance for a scanning operation performed by the operator can be improved. In addition, codes can be recorded on a recording medium at a high density.

Furthermore, the operator can scan and reproduce only a desired code of information units, in multimedia information including, e.g., sound, picture, and character data, which can be reproduced in the form of a sound, a picture, and characters.

(32) There is provided a recording medium having a portion on which multimedia information including at least one of audio information, video information, and digital code data is recorded as optically readable codes, > wherein an information reproduction system, which is adapted to read the codes and output the read data as the original multimedia information and to which the codes are to be applied, includes restoration means for demodulating the read codes and outputting demodulated data,
>
> reproduction means for performing processing associated with error correction for the demodulated data output from the restoration means, and
>
> output means for outputting the data, output from the reproduction means, as the original multimedia information to be recognizable, and
>
> a data amount of one of the codes is larger than a unit data amount for processing associated with error correction for demodulated data which is performed by the reproduction means, and the processing associated with the error correction is completed within one of the codes.

That is, information having undergone error correction can be obtained by scanning one code. In addition, the operator can scan and reproduce only a desired code of information units, in multimedia information including, e.g., sound, picture, and character data, which can be reproduced in the form of a sound, a picture, and characters.

(33) There is provided a recording medium having a portion on which multimedia information including at least one of audio information, video information, and digital code data is recorded as optically readable codes, wherein an information reproduction system, which is adapted to read the codes and output the read data as the original multimedia information and to which the codes are to be applied, includes restoration means for demodulating the read codes and outputting demodulated data, expansion means for performing processing associated with data expansion for the demodulated data output from the restoration means, and output means for outputting the data, output from the expansion means, as the original multimedia information to be recognizable, and a data amount of one of the codes is larger than a unit data amount for processing associated with expansion processing for the demodulated data which is performed by the expansion means, and the expansion processing is completed within one of the codes.

That is, information having undergone expansion processing can be obtained by scanning one code. In addition, the operator can scan and reproduce only a desired code of information units, in multimedia information including, e.g., sound, picture, and character data, which can reproduced in the form of a sound, a picture, and characters.

(34) There is provided a recording medium having a portion on which multimedia information including at least one of audio information, video information, and digital code data is recorded as an optically readable code, wherein an indicator for indicating a unit of scanning for a code reading operation is arranged in or near the code.

That is, even if a given code is divided and recorded, the code can be discriminated as one code.

(35) In the recording medium according to arrangement (34), the code is arranged as a plurality of spatially divided codes on the recording medium, and the indicator for indicating the unit of scanning indicates a scanning order in which the plurality of codes are sequentially read.

That is, even if a given code is divided and recorded, the code can be discriminated as one code, and the scanning order of the divided codes can be recognized.

(36) In the recording medium according to arrangement (34), the indicator for indicating the unit of scanning is indicated in accordance with an operation form of a code reading start switch of an information reproduction system which is to be applied to the recording medium.

That is, even if a given code is divided and recorded, the code can be discriminated as one code, and the scanning order of the divided codes can be recognized. In addition, the way to operate the switch can be easily recognized.

(37) In the recording medium according to arrangement (36), the indicator for indicating the unit of scanning is arranged at each of two positions near start and end portions of a code, the indicator near the start portion illustrating a depressed state of the switch, and the indicator near the end portion illustrating a released state of the switch.

That is, even if a given code is divided and recorded, the code can be discriminated as one code. In addition, the way to operate the switch can be easily recognized.

(38) In the recording medium according to any one of arrangements (34) and (35), the indicator for indicating the unit of scanning is a character or number.

That is, even if a given code is divided and recorded, the code can be discriminated as one code, and the scanning order of the divided codes can be recognized.

(39) In the recording medium according to any one of arrangements (34) to (38), the indicator for indicating the unit of scanning is constituted by at least one code selected from the group consisting of a code identical to part of data included in the code, a code constituting part of the code, a code indicating header information associated with the code, and a code which is not associated with the multimedia information.

That is, even if a given code is divided and recorded, the code can be discriminated as one code, and the scanning order of the divided codes can be recognized. If an indicator also serves as a code, a space can be saved. If repetitive data are used, scanning errors can be reduced.

(40) There is provided an information recording system including input means for inputting multimedia information including at least one of audio information, video information, and digital code data, conversion means for converting the multimedia information input by the input means into an optically readable code, and recording means for recording the code converted by the conversion means on a recording medium to be optically readable, the code being constituted by a linked structure obtained by two-dimensionally arranging blocks each having data associated with the multimedia information and unique address data thereof, comprising:

output layout editing means for performing layout editing of the multimedia information input by the input means with respect to a recording medium when the multimedia information is to be output to the recording means; and block address data setting means for setting block address data to be added to blocks constituting the code in accordance with a layout state of the code which is set by the output layout editing means.

That is, optimal address data can be added to each code in accordance with an output layout state.

(41) In the information recording system according to arrangement (40), block address data setting means includes means for, when the code subjected to layout editing in the output layout editing means includes a plurality of codes, and the codes are arranged to be adjacent to each other, making block address data to be added to one of the codes differ from block address data to be added to another of the codes.

That is, even if a code adjacent to a desired code is erroneously scanned, necessary information is not interfered. For this reason, the tolerance for a scanning operation performed by the operator can be improved. In addition, codes can be recorded on a recording medium at a high density.

(42) There is provided an information recording system including input means for inputting multimedia information including at least one of audio information, video information, and digital code data, compression means for compressing data associated with the multimedia information input by the input means, conversion means for converting the data compressed by the compression means into an optically readable code, and recording means for recording the code converted by the conversion means on a recording medium to be optically readable, comprising:

data editing means for dividing a series of data associated with the multimedia information input by the input means in predetermined units, and outputting the divided data to the compression means; and compression control means for setting a unit of data compression processing in the compression means on the basis of information of division of the series of data which is performed by the data editing means.

That is, the system can create a compressed code as an information unit, in multimedia information including, e.g., sound, picture, and character data, which can be reproduced in the form of a sound, a picture information, or characters.

(43) There is provided an information recording system including input means for inputting multimedia information including at least one of audio information, video information, and digital code data, error correction means for performing error correction processing for data associated with the multimedia information input by the input means, conversion means for converting the data error-corrected by the error correction means into an optically readable code, and recording means for recording the code converted by the conversion means on a recording medium to be optically readable, comprising:

data editing means for dividing a series of data associated with the multimedia information input by the input means in predetermined units, and outputting the divided data to the error correction means; and error correction control means for setting a unit of data correction processing in the error correction means on the basis of information of division of the series of data which is performed by the data editing means.

That is, the system can create a code including an error correction code as an information unit, in multimedia information including, e.g., sound, picture, and character data, which can be reproduced in the form of a sound, a picture information, or characters.

As has been described above, according to the information reproduction system, the information recording system, and the recording medium of the present invention, the operator can easily operate the systems, and a great improvement in operability can be attained, thereby realizing an excellent man-machine interface in terms of human engineering and other respects.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An information reproduction system comprising:

reading means for optically reading a code from a recording medium having a portion on which multimedia information including at least one of audio information, video information, and digital code data is recorded as an optically readable code;

a plurality of processing means for sequentially processing the code read by said reading means and outputting the processed code as the original multimedia information;

an operation switch for designating a start of reading of the code; and control means causing one or a plurality of said plurality of processing means to terminate a processing operation for a code which has been read by the time said operation switch is operated, and executing processing for data of the processed code in correspondence with another processing means on a subsequent stage, on the basis of an operation of said operation switch after the start of reading is designated by said operation switch.

2. A system according to claim 1, wherein said plurality of processing means comprise:

restoration means for demodulating the code read by said reading means and outputting the demodulated data; and reproduction means for performing processing associated with error correction for the demodulated data output from said restoration means, and said control means causes said restoration means to terminate processing for a code which has been read by the time said operation switch is operated, and causes said reproduction means to reproduce data of the processed code, on the basis of an operation of said operation switch after the start of reading is designated by said operation switch.

3. A system according to claim 1, wherein said plurality of processing means comprise:

restoration means for demodulating the code read by said reading means and outputting the demodulated data;

reproduction means for performing processing associated with error correction for the demodulated data output from said restoration means; and output means for outputting the data, output from said reproduction means, as the original multimedia information to be recognizable, and said control means causes said restoration means to terminate a processing operation for a code which has been read by the time said operation switch is operated, causes said reproduction means to reproduce data of the processed code, and causes said output means to process the data from said reproduction means and output the data as the multimedia information, on the basis of an operation of said operation switch after the start of reading is designated by said operation switch.

4. A system according to claim 1, wherein said plurality of processing means comprise:

restoration means for demodulating the code read by said reading means and outputting the demodulated data;

reproduction means for performing processing associated with error correction for the demodulated data output from said restoration means; and output means for outputting the data, output from said reproduction means, as the original multimedia information to be recognizable, and said control means causes said restoration means and said reproduction means to terminate processing operations for a code which has been read by the time said operation switch is operated, and causes said output means to process the data from said reproduction means and output the data as the multimedia information, on the basis of an operation of said operation switch after the start of reading is designated by said operation switch.

5. A system according to any one of claims 1 to 4, wherein said operation switch is a self-reset switch which is arranged on a housing having at least said reading means and can be set in an ON state only in a depressed state, and the code is read while said operation switch is depressed, and a releasing operation for said operation switch corresponds to the operation of said operation switch after the start of reading is designated by said operation switch.

6. A system according to any one of claims 1 to 4, wherein said operation switch is a self-reset switch which is arranged on a housing having at least said reading means and can be set in an ON state only in a depressed state, and the code is read by a clicking operation including instantaneous depressing and releasing operations, and a re-clicking operation corresponds to the operation of said operation switch after the start of reading is designated by said operation switch.

7. A system according to any one of claims 1 to 4, wherein said operation switch is a self-reset switch which is arranged on a housing having at least said reading means and can be set in an ON state by a clicking operation including instantaneous depressing and releasing operations, and the code is read by performing the clicking operation once or a plurality of number of times, and a clicking operation performed the number of times different from the number of times of clicking operations performed before corresponds to the operation of said operation switch after the start of reading is designated by said operation switch.

8. An information reproduction system comprising:

reading means for optically reading a code from a recording medium having a portion on which multimedia information including at least one of audio information, video information, and digital code data is recorded as an optically readable code;

a plurality of processing means for sequentially processing the code read by said reading means and outputting the processed code as the original multimedia information;

a first operation switch for designating a start of reading of the code;

a second operation switch for designating an end of reading of the code; and control means causing one or a plurality of said plurality of processing means to terminate a processing operation for a code which has been read by the time said second operation switch is operated, and executing processing for data of the processed code in correspondence with another processing means on a subsequent stage, on the basis of an operation of said second operation switch.

9. A system according to claim 8, wherein said plurality of processing means comprise:

restoration means for demodulating the code read by said reading means and outputting the demodulated data; and reproduction means for performing processing associated with error correction for the demodulated data output from said restoration means, and said control means causes said restoration means to terminate processing for a code which has been read by the time said second operation switch is operated, and causes said reproduction means to reproduce data of the processed code, on the basis of an operation of said second operation switch.

10. A system according to claim 8, wherein said plurality of processing means comprise:

restoration means for demodulating the code read by said reading means and outputting the demodulated data;

reproduction means for performing processing associated with error correction for the demodulated data output from said restoration means; and output means for outputting the data, output from said reproduction means, as the original multimedia information to be recognizable, and said control means causes said restoration means to terminate a processing operation for a code which has been read by the time said second operation switch is operated, causes said reproduction means to reproduce data of the processed code, and causes said output means to process the data from said reproduction means and output the data as the multimedia information, on the basis of an operation of said second operation switch.

11. A system according to claim 8, wherein said plurality of processing means comprise:

restoration means for demodulating the code read by said reading means and outputting the demodulated data;

reproduction means for performing processing associated with error correction for the demodulated data output from said restoration means; and output means for outputting the data, output from said reproduction means, as the original multimedia information to be recognizable, and said control means causes said restoration means and said reproduction means to terminate processing operations for a code which has been read by the time said second operation switch is operated, and causes said output means to process the data from said reproduction means and output the data as the multimedia information, on the basis of an operation of said second operation switch.

12. A system according to any one of claims 8 to 11, wherein said first operation switch is a power switch of said information reproduction system, and said second operation switch is an operation switch arranged on a housing having at least said reading means.

13. An information reproduction system comprising:

reading means for optically reading a code from a recording medium having a portion on which multimedia information including at least one of audio information, video information, and digital code data is recorded as an optically readable code;

a plurality of processing means for sequentially processing the code read by said reading means and outputting the processed code as the original multimedia information;

a first operation switch for designating a start of reading of the code;

a second operation switch for designating an end of reading of the code; and control means for outputting data of a code, which has been read by the time said second operation switch is operated and is processed by one or a plurality of said plurality of processing means, as the original multimedia information, on the basis of an operation of said second operation switch.

14. A system according to claim 13, wherein an operation of said first operation switch corresponds to an operation for allowing power to be supplied to said information reproduction system.

15. An information reproduction system comprising:

reading means for optically reading a code from a recording medium having a portion on which multimedia information including at least one of audio information, video information, and digital code data is recorded as an optically readable code;

a plurality of processing means for sequentially processing the code read by said reading means and outputting the processed code as the original multimedia information;

a sub-switch which is arranged on a reading surface of a housing including at least said reading means to form an ON/OFF state in accordance with contact with a recording medium to designate a start of reading of the code;

a main switch for permitting/inhibiting an operation of said sub-switch;

control means causing one or a plurality of said plurality of processing means to terminate a processing operation for a code which has been read by the time said sub-switch is operated, and executing processing for data of the processed code in correspondence with another processing means on a subsequent stage, on the basis of an operation of said sub-switch after the start of reading; and output control means for outputting the data processed by said another processing means as the multimedia information on the basis of an operation of said main switch.

16. An information reproduction system comprising:

reading means for optically reading a code from a recording medium having a portion on which multimedia information including at least one of audio information, video information, and digital code data is recorded as an optically readable code;

restoration means for demodulating the code read by said reading means and outputting the demodulated and;

reproduction means for performing processing associated with error correction for the demodulated data output from said restoration means;

output means for outputting the data, output from said reproduction means, as the original multimedia information to be recognizable;

an operation switch for designating a start of reading of the code;

determination means for determining whether a code to be applied to said information reproduction system is read by said reading means in a predetermined period of time after an operation of said operation switch; and notification means for notifying a state in accordance with the determination result obtained by said determination means.

17. An information reproduction system comprising:

reading means for optically reading a code from a recording medium having a portion on which multimedia information including at least one of audio information, video information, and digital code data is recorded as an optically readable code;

restoration means for demodulating the code read by said reading means and outputting the demodulated data;

reproduction means for performing processing associated with error correction for the demodulated data output from said restoration means;

output means for outputting the data, output from said reproduction means, as the original multimedia information to be recognizable;

an operation switch for designating a start of reading of the code;

determination means for determining whether a code to be applied to said information reproduction system is read by said reading means in a predetermined period of time after an operation of said operation switch; and power supply control means for supplying power to only a predetermined circuit portion in said information reproduction system when said determination means determines that the code is not read.

18. An information reproduction system comprising:

reading means for optically reading a code from a recording medium having a portion on which multimedia information including at least one of audio information, video information, and digital code data is recorded as an optically readable code;

restoration means for demodulating the code read by said reading means and outputting the demodulated data;

reproduction means for performing processing associated with error correction for the demodulated data output from said restoration means;

an operation switch for designating a start of reading of the code;

determination means for determining whether a code to be applied to said information reproduction system is read by said reading means in a predetermined period of time after an operation of said operation switch; and control means for causing said restoration means to terminate a processing operation when said determination means determines that the code is not read.

19. An information reproduction system comprising:

reading means for optically reading a code from a recording medium having a portion on which multimedia information including at least one of audio information, video information, and digital code data is recorded as an optically readable code;

restoration means for demodulating the code read by said reading means and outputting the demodulated data;

reproduction means for performing processing associated with error correction for the demodulated data output from said restoration means;

determination means for determining whether a code to be applied to said information reproduction system is detected in a predetermined period of time after the code is detected by said restoration means; and notification means for, when said determination means determines that the code is not detected, notifying that the code is not detected.

20. An information reproduction system comprising:

reading means for optically reading a code from a recording medium having a portion on which multimedia information including at least one of audio information, video information, and digital code data is recorded as an optically readable code;

restoration means for demodulating the code read by said reading means and outputting the demodulated data;

reproduction means for performing processing associated with error correction for the demodulated data output from said restoration means;

determination means for determining whether all codes read by said reading means and processed by said restoration means are codes to be applied to said information reproduction system; and notification means for, when said determination means determines that all the codes read by said reading means are not codes to be applied to said information reproduction system, notifying that all the codes are not codes to be applied to said information reproduction system.

21. An information reproduction system comprising:

reading means for optically reading a code from a recording medium having a portion on which multimedia information including at least one of audio information, video information, and digital code data is recorded as an optically readable code;

restoration means for demodulating the code read by said reading means and outputting the demodulated data;

reproduction means for performing processing associated with error correction for the demodulated data output from said restoration means; and notification means for, when it is determined that a code processed by said restoration means is a code to be applied to said information reproduction system and cannot be reproduced by said reproduction means, notifying that the code is to be applied to said information reproduction system and cannot be reproduced by said reproduction means.

22. An information reproduction system comprising:

reading means for optically reading a code from a recording medium having a portion on which multimedia information including at least one of audio information, video information, and digital code data is recorded as an optically readable code;

restoration means for demodulating the code read by said reading means and outputting the demodulated data;

reproduction means for performing processing associated with error correction for the demodulated data output from said restoration means;

output means for outputting the data, output from said reproduction means, as the original multimedia information to be recognizable; and notification means for, when reproduction can be performed by said reproduction means and data associated with a previous code reading operation is left in an output buffer in said output means, notifying that reproduction can be performed by said reproduction means and the data associated with the previous code reading operation is left in said output buffer.

23. An information reproduction system comprising:

reading means for optically reading a code from a recording medium having a portion on which multimedia information including at least one of audio information, video information, and digital code data is recorded as an optically readable code;

restoration means for demodulating the code read by said reading means and outputting the demodulated data;

reproduction means for performing processing associated with error correction for the demodulated data output from said restoration means;

output means for outputting the data, output from said reproduction means, as the original multimedia information to be recognizable; and notification control means for notifying an error state upon changing a notification output form in accordance with each error type in order to notify each of error states associated with a code reading operation of said reading means and an operation of outputting the multimedia information from said output means.

24. An information reproduction system comprising:

reading means for optically reading a code from a recording medium having a portion on which multimedia information including at least one of audio information, video information, and digital code data is recorded as an optically readable code;

restoration means for demodulating the code read by said reading means and outputting the demodulated data;

reproduction means for performing processing associated with error correction for the demodulated data output from said restoration means; and output means for outputting the data, output from said reproduction means, as the original multimedia information to be recognizable, wherein said restoration means includes a data memory for storing demodulated data, and said reproduction means includes an output buffer memory for temporarily storing data having undergone error correction when the data is to be output to said output means.

25. A system according to claim 24, wherein said data memory and said output buffer memory are constituted by the same memory module.

26. An information reproduction system comprising:

reading means for optically reading a code from a recording medium having a portion on which multimedia information including at least one of audio information, video information, and digital code data is recorded as an optically readable code;

restoration means for demodulating the code read by said reading means and outputting the demodulated data;

reproduction means for performing processing associated with error correction for the demodulated data output from said restoration means; and output means for outputting the data, output from said reproduction means, as the original multimedia information to be recognizable, wherein the code is constituted by a linked structure obtained by two-dimensionally arranging blocks each having data associated with the multimedia information and unique address data thereof, and said restoration means has a data memory in which address spaces are set in on-to-one correspondence with addresses of the blocks to store data associated with the multimedia information in units of blocks.

27. A system according to claim 26, wherein said data memory has a block management table area for storing storage/non-storage information in units of blocks, the information indicating whether data associated with multimedia information is stored at the address of a corresponding one of the blocks.

28. An information reproduction system comprising:

reading means for optically reading a code from a recording medium having a portion on which multimedia information including at least one of audio information, video information, and digital code data is recorded as an optically readable code;

restoration means for demodulating the code read by said reading means and outputting the demodulated data;

reproduction means for performing processing associated with error correction for the demodulated data output from said restoration means; and output means for outputting the data, output from said reproduction means, as the original multimedia information to be recognizable, wherein when one of the codes is arranged as a plurality of spatially divided codes on a recording medium because the code is constituted by data in an amount determined by a capacity of a data memory for storing the demodulated data, each of the divided codes includes division information indicating that the divided code is a portion of the plurality of divided codes constituting said one of the codes, and said output means recognizes an aggregated state of all the divided codes associated with said one of the codes by detecting the division information, and outputs the multimedia information corresponding to said one of the codes on the basis of the recognition result.

29. A recording medium having a portion on which multimedia information including at least one of audio information, video information, and digital code data is recorded as optically readable codes, wherein an information reproduction system, which is adapted to read the codes and to which the codes are to be applied, has a data memory for storing demodulated data obtained by demodulating the codes, and a data amount of one of the codes is determined on the basis of a capacity of said data memory.

30. A recording medium having a portion on which multimedia information including at least one of audio information, video information, and digital code data is recorded as optically readable codes, wherein an information reproduction system, which is adapted to read the codes and to which the codes are to be applied, has a data memory for storing demodulated data obtained by demodulating the codes, and when one of the codes is arranged as a plurality of spatially divided codes on a recording medium because said one of the codes is constituted by data in an amount determined by a capacity of said data memory for storing the demodulated data, each of the divided codes includes division information indicating that one of the divided codes is a portion of the plurality of divided codes constituting said one of the codes.

31. A recording medium having a portion on which multimedia information including at least one of audio information, video information, and digital code data is recorded as optically readable codes, wherein each of the codes is constituted by a linked structure obtained by two-dimensionally arranging blocks each having data associated with the multimedia information and unique address data thereof, and one of the codes and another of the codes which are arranged on said recording medium to be adjacent to each other have different block address data.

32. A recording medium having a portion on which multimedia information including at least one of audio information, video information, and digital code data is recorded as optically readable codes, wherein an information reproduction system, which is adapted to read the codes and output the read data as the original multimedia information and to which the codes are to be applied, includes restoration means for demodulating the read codes and outputting demodulated data, reproduction means for performing processing associated with error correction for the demodulated data output from said restoration means, and output means for outputting the data, output from said reproduction means, as the original multimedia information to be recognizable, and a data amount of one of the codes is larger than a unit data amount for processing associated with error correction for demodulated data which is performed by said reproduction means, and the processing associated with the error correction is completed within said one of the codes.

33. A recording medium having a portion on which multimedia information including at least one of audio information, video information, and digital code data is recorded as optically readable codes, wherein an information reproduction system, which is adapted to read the codes and output the read data as the original multimedia information and to which the codes are to be applied, includes restoration means for demodulating the read codes and outputting demodulated data, expansion means for performing processing associated with data expansion for the demodulated data output from said restoration means, and output means for outputting the data, output from said expansion means, as the original multimedia information to be recognizable, and a data amount of one of the codes is larger than a unit data amount for processing associated with expansion processing for the demodulated data which is performed by said expansion means, and the expansion processing is completed within said one of the codes.

34. A recording medium having a portion on which multimedia information including at least one of audio information, video information, and digital code data is recorded as an optically readable code, wherein an indicator for indicating a unit of scanning for a code reading operation is arranged in or near said code.

35. A medium according to claim 34, wherein said code is arranged as a plurality of spatially divided codes on said recording medium, and the indicator for indicating the unit of scanning indicates a scanning order in which the plurality of codes are sequentially read.

36. A medium according to claim 34, wherein the indicator for indicating the unit of scanning is indicated in accordance with an operation form of a code reading start switch of an information reproduction system which is to be applied to said recording medium.

37. A medium according to claim 36, wherein the indicator for indicating the unit of scanning is arranged at each of two positions near start and end portions of a code, the indicator near the start portion illustrating a depressed state of said switch, and the indicator near the end portion illustrating a released state of said switch.

38. A medium according to any one of claims 34 and 35, wherein the indicator for indicating the unit of scanning is a character or number.

39. A medium according to any one of claims 34 to 38, wherein the indicator for indicating the unit of scanning is constituted by at least one code selected from the group consisting of a code identical to part of data included in said code, a code constituting part of said code, a code indicating header information associated with said code, and a code which is not associated with the multimedia information.

40. An information recording system comprising:

input means for inputting multimedia information including at least one of audio information, video information, and digital code data;

conversion means for converting the multimedia information input by said input means into an optically readable code;

recording means for recording the code converted by said conversion means on a recording medium to be optically readable, the code being constituted by a linked structure obtained by two-dimensionally arranging blocks each having data associated with the multimedia information and unique address data thereof;

output layout editing means for performing layout editing of the multimedia information input by said input means with respect to a recording medium when the multimedia information is to be output to said recording means; and block address data setting means for setting block address data to be added to blocks constituting the code in accordance with a layout state of the code which is set by said output layout editing means.

41. A system according to claim 40, wherein block address data setting means includes means for, when the code subjected to layout editing in said output layout editing means includes a plurality of codes, and the codes are arranged to be adjacent to each other, making block address data to be added to one of the codes differ from block address data to be added to another of the codes.

42. An information recording system comprising:

input means for inputting multimedia information including at least one of audio information, video information, and digital code data;

compression means for compressing data associated with the multimedia information input by said input means;

conversion means for converting the data compressed by said compression means into an optically readable code;

recording means for recording the code converted by said conversion means on a recording medium to be optically readable;

data editing means for dividing a series of data associated with the multimedia information input by said input means in predetermined units, and outputting the divided data to said compression means; and compression control means for setting a unit of data compression processing in said compression means on the basis of information of division of the series of data which is performed by said data editing means.

43. An information recording system comprising:

input means for inputting multimedia information including at least one of audio information, video information, and digital code data;

error correction means for performing error correction processing for data associated with the multimedia information input by said input means;

conversion means for converting the data error-corrected by said error correction means into an optically readable code;

recording means for recording the code converted by said conversion means on a recording medium to be optically readable;

data editing means for dividing a series of data associated with the multimedia information input by said input means in predetermined units, and outputting the divided data to said error correction means; and error correction control means for setting a unit of data correction processing in said error correction means on the basis of information of division of the series of data which is performed by said data editing means.

* * * * *